United States Patent
Yamaguchi et al.

(10) Patent No.: US 7,599,781 B2
(45) Date of Patent: Oct. 6, 2009

(54) CONTROL SYSTEM FOR INTERNAL COMBUSTION ENGINE

(75) Inventors: Satoshi Yamaguchi, Saitama-ken (JP); Mamoru Hasegawa, Saitama-ken (JP); Naoto Kitayama, Saitama-ken (JP); Hideki Sakamoto, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 214 days.

(21) Appl. No.: 11/892,698

(22) Filed: Aug. 27, 2007

(65) Prior Publication Data

US 2008/0051978 A1 Feb. 28, 2008

(30) Foreign Application Priority Data

Aug. 25, 2006 (JP) .............................. 2006-228933
Nov. 14, 2006 (JP) .............................. 2006-308150

(51) Int. Cl.
  *G06F 19/00* (2006.01)
  *G01N 33/22* (2006.01)
  *G01M 15/00* (2006.01)

(52) U.S. Cl. ..................... 701/103; 701/113; 73/35.02; 73/114.38

(58) Field of Classification Search ................. 123/435, 123/436, 478, 480, 494; 701/101–105, 110–115; 73/35.02, 114.38, 114.52, 114.53
See application file for complete search history.

(56) References Cited

U.S. PATENT DOCUMENTS

| | | | | |
|---|---|---|---|---|
| 5,469,831 A | * | 11/1995 | Takahashi | 123/680 |
| 5,586,537 A | * | 12/1996 | Tomisawa et al. | 123/435 |
| 5,732,681 A | * | 3/1998 | Ogita | 123/492 |
| 6,073,611 A | * | 6/2000 | Ohuchi et al. | 123/435 |
| 6,363,313 B1 | * | 3/2002 | Katoh et al. | 701/104 |
| 6,550,449 B2 | * | 4/2003 | Akazaki et al. | 123/339.11 |
| 6,769,388 B2 | * | 8/2004 | Watanabe et al. | 123/179.18 |
| 7,050,901 B2 | * | 5/2006 | Yasuda et al. | 701/113 |
| 7,480,557 B2 | * | 1/2009 | Yamaguchi et al. | 701/104 |
| 2008/0103671 A1 | * | 5/2008 | Yamaguchi et al. | 701/102 |
| 2008/0262699 A1 | * | 10/2008 | Hasegawa et al. | 701/103 |

FOREIGN PATENT DOCUMENTS

| | | | | | |
|---|---|---|---|---|---|
| JP | 7-286547 A | * | 10/1995 | | 73/35.02 |
| JP | 11117787 A | * | 4/1999 | | 73/114.38 |
| JP | 2001107795 A | * | 4/2001 | | 701/102 |
| JP | 2004278449 A | * | 10/2004 | | 701/113 |
| JP | 2004346911 A | * | 12/2004 | | 73/35.02 |
| JP | 2006009720 A | * | 1/2006 | | 73/35.02 |

* cited by examiner

*Primary Examiner*—Willis R Wolfe, Jr.
(74) *Attorney, Agent, or Firm*—Arent Fox LLP

(57) ABSTRACT

A control system for an internal combustion engine, which makes it possible to estimate a fuel property parameter indicative of a property of fuel in use, in a plurality of operation modes of the engine, respectively, to thereby increase the chances of estimation of the fuel property parameter, and select an appropriate one from the estimated fuel property parameters to thereby more appropriately control the engine. The fuel property parameter is estimated when the detected operating conditions of the engine correspond to any of a plurality of operation modes. Depending on a plurality of fuel property parameters estimated in respective operation modes, one of the fuel property parameters is determined as the fuel property parameter for control of the engine.

7 Claims, 17 Drawing Sheets

FIG. 14

(a) CET 1

| NE \ PMCMD | PMCMD1 | ......... | PMCMDj |
|---|---|---|---|
| NE1 | QHRDREF111 | ......... | QHRDREF11j |
| : | : | | : |
| NEi | QHRDREF1i1 | ......... | QHRDREF1ij |

(b) CET 2

| NE \ PMCMD | PMCMD1 | ......... | PMCMDj |
|---|---|---|---|
| NE1 | QHRDREF211 | ......... | QHRDREF21j |
| : | : | | : |
| NEi | QHRDREF2i1 | ......... | QHRDREF2ij |

(c) CET 3

| NE \ PMCMD | PMCMD1 | ......... | PMCMDj |
|---|---|---|---|
| NE1 | QHRDREF311 | ......... | QHRDREF31j |
| : | : | | : |
| NEi | QHRDREF3i1 | ......... | QHRDREF3ij |

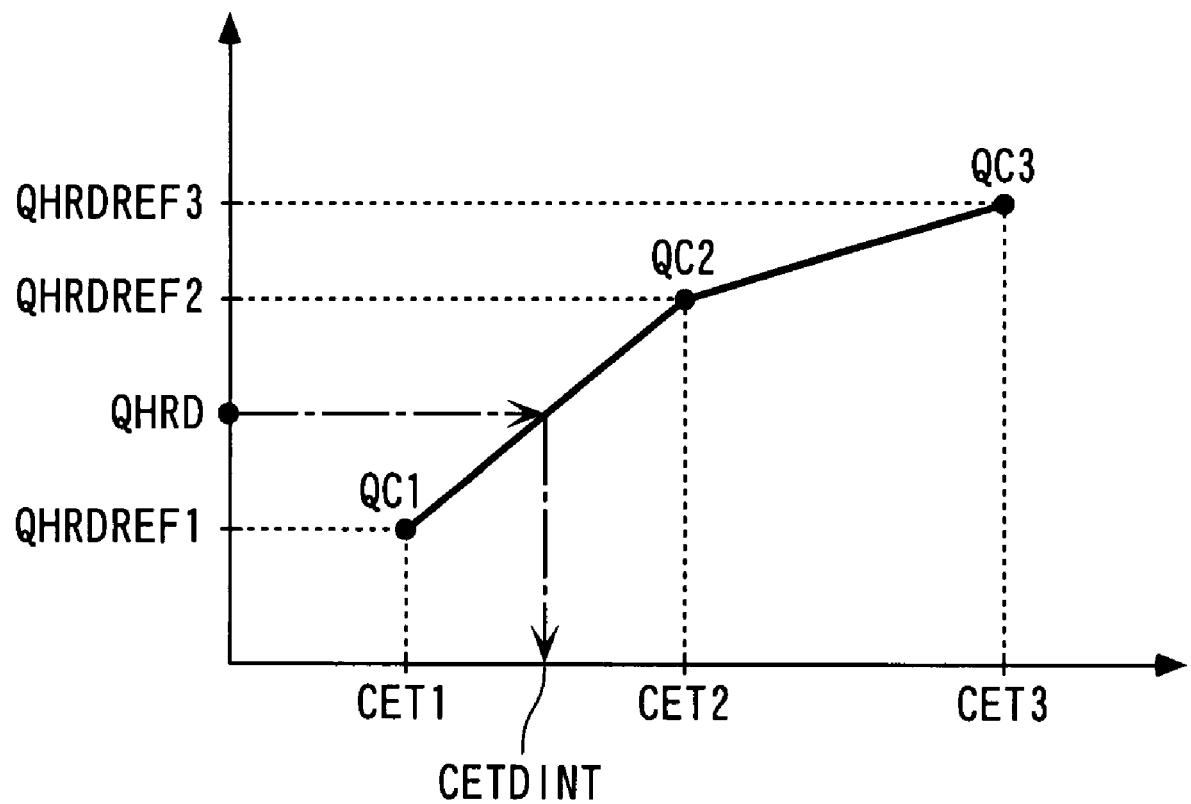
F I G. 1 5

CONTROL SYSTEM FOR INTERNAL COMBUSTION ENGINE

BACKGROUND OF THE INVENTION

1. Field of the Invention

This invention relates to a control system for an internal combustion engine installed on a vehicle, for controlling the engine according to a property of fuel used in the engine.

2. Description of the Related Art

Conventionally, there has been proposed a control system of this kind in e.g. in Japanese Laid-Open Patent Publication (Kokai) No. 2005-344557. In this control system, during fuel cut-off operation of the engine, a predetermined amount of fuel is injected into a combustion chamber, and ignition timing of the fuel is calculated based on a heat release amount parameter. Further, a cetane number of the fuel is determined based on ignition delay determined based on the calculated ignition timing.

In the conventional control system, to estimate the cetane value, fuel is injected when the engine is in an operating condition during which it should be subjected to fuel cut-off operation, and hence the fuel is wastefully consumed. Further, in the control system, only when the engine is in fuel cut-off operation, the cetane number is estimated. Therefore, for example, after refueling, if the fuel cut-off operation is not carried for a long time, the cetane number of the fuel cannot be estimated all this while, and hence the engine is controlled using the cetane number determined before refueling. Therefore, if the cetane number is much different between before and after refueling, the engine cannot be properly controlled, and in particular, when the cetane number of refueled fuel is lower, there is a fear that a misfire occurs.

SUMMARY OF THE INVENTION

The present invention has been made in view of the above problems, and an object of the invention is to provide a control system for an internal combustion engine, which makes it possible to estimate a fuel property parameter indicative of a property of fuel in use, in a plurality of operation modes of the engine, respectively, to thereby increase the chances of estimation of the fuel property parameter, and select an appropriate one from the estimated fuel property parameters to thereby more appropriately control the engine.

To attain the above object, the present invention provides a control system for an internal combustion engine, for controlling the engine based on a fuel property parameter indicative of a property of fuel used in the engine which is installed on a vehicle, comprising operating condition-detecting means for detecting operating conditions of the engine, fuel property parameter-estimating means for estimating the fuel property parameter when the detected operating conditions of the engine correspond to any of a plurality of operation modes, and fuel property parameter-determining means for determining, depending on a plurality of fuel property parameters estimated in the respective operation modes, one of the fuel property parameters as the fuel property parameter for control of the engine.

With the configuration of the control system according to the invention, operating conditions of the engine installed on the vehicle are detected, and when the detected operating conditions correspond to any of the operation modes, the fuel property parameter indicative of a property of fuel is estimated. Thus, the fuel property parameter of fuel in use is estimated in the plurality of operation modes, which makes it possible to increase the execution of estimation of the fuel property parameter. Further, depending on the fuel property parameters estimated in the respective operation modes, one of these is determined as the fuel property parameter for control of the engine. For example, a fuel property parameter which is more appropriately estimated and is more reliable is finally determined as the fuel property parameter for the control, and the thus determined fuel property parameter is used to thereby more properly control the engine.

Preferably, the fuel property parameter-determining means determines a predetermined fuel property parameter as the fuel property parameter for the control, when estimation of the fuel property parameter by the fuel property parameter-estimating means has not been carried out.

With the configuration of this preferred embodiment, when estimation of the fuel property parameter by the fuel property parameter-estimating means has not been carried out, a predetermined fuel property parameter is determined as the fuel property parameter for the control. In general, it often occurs that the property of fuel changes between before and after refueling, and in the case where estimation of the fuel property parameter is not executed after refueling, if the fuel property parameter used before refueling is used for control of the engine, combustion of the engine can be made unstable. For example, when the fuel property parameter is a cetane number, if the cetane number of refueled fuel has a lower cetane number, a misfire occurs. Therefore, when the estimation of the fuel property parameter is not executed, by determining a predetermined fuel property parameter which prevents stability of combustion of the engine from being degraded, for example, as the fuel property parameter for the control, it is possible to suppress instability of combustion of the engine.

Preferably, the operation modes include idling of the engine, and a predetermined traveling state of the vehicle.

With this configuration of the preferred embodiment, the cooperation modes include idling of the engine, and a predetermined traveling state of the vehicle, and hence during idling of the engine and during traveling of the vehicle, estimation of the fuel property parameter can be executed. Accordingly, when estimation of the fuel property parameter should be executed, e.g. after refueling, if idling of the engine is sufficiently carried out before the standing start of the vehicle, it is possible to execute the estimation of the fuel property parameter during idling of the engine, whereas even if idling of the engine is not sufficiently carried out, it is possible to execute the estimation of the fuel property parameter during traveling of the vehicle. Therefore, in both of the cases, the estimated fuel property parameter can be used for control of the engine.

Preferably, the fuel property parameter is a cetane number of fuel, and the fuel property parameter-determining means determines a highest one of a plurality of cetane numbers estimated by the fuel property parameter-estimating means as a cetane number for the control.

With this configuration of the preferred embodiment, the fuel property parameter is a cetane number of fuel, and a highest one of a plurality of estimated cetane numbers is determined as a cetane number for the control. Fuel contains more HC components as it has a higher cetane number. Therefore, if the engine is controlled using a cetane number lower than the actual cetane number of fuel, abnormal combustion tends to occur in which PM increases. Therefore, by determining a higher one of the estimated cetane numbers as one for the control, it is possible to avoid the abnormal combustion, and prevent increase in PM.

Preferably, the operation modes include a predetermined first operation mode, and a predetermined second operation mode in which accuracy of estimation of the fuel property parameter by the fuel property parameter-estimating means is considered to be lower than in the predetermined first operation mode, and the control system further comprises correction value-setting means for setting, based on a relationship between a first operation mode fuel property parameter estimated in the first operation mode and a second operation mode fuel property parameter estimated in the second operation mode, a correction value for correcting the second operation mode fuel property parameter.

With this configuration of the preferred embodiment, a first operation mode fuel property parameter and a second operation mode fuel property parameter are estimated in a predetermined first operation mode and a predetermined second operation mode in which accuracy of estimation of the fuel property parameter is considered to be lower than in the predetermined first operation mode, respectively. A correction value for correcting the second operation mode fuel property parameter is set based on a relationship between the first operation mode fuel property parameter and the second operation mode fuel property parameter.

The present invention is based on a viewpoint that the accuracy of estimation of the fuel property parameter is different between operation modes of the engine. In this preferred embodiment, by defining an operation mode in which the accuracy of estimation of the fuel property parameter is considered to be higher as the predetermined first operation mode, and an operation mode in which the accuracy of estimation of the fuel property parameter is considered to be lower as the predetermined second operation mode, the correction value is set based on the relationship between the first and second operation mode fuel property parameters estimated in the respective modes. Then, the second operation mode fuel property parameter is corrected based on the correction value, whereby the second operation mode fuel property parameter lower in reliability is corrected with reference to the first operation mode fuel property parameter higher in reliability. This makes it possible to obtain a fuel property parameter which indicates the actual property of fuel more excellently.

Preferably, the control system further comprises refueling detection means for detecting whether or not refueling has been carried out, and fuel property parameter-correcting means for correcting the second operation mode fuel property parameter based on the correction value, when estimation of the first operation mode fuel property parameter is not carried out and at the same time estimation of the second operation mode fuel property parameter is carried out, until a predetermined time period elapses after refueling is detected.

With this configuration of the preferred embodiment, when estimation of the first operation mode fuel property parameter is not carried out and at the same time estimation of the second operation mode fuel property parameter is carried out, until a predetermined time period elapses after refueling is detected, the second operation mode fuel property parameter is corrected based on the correction value set by the correction value-setting means. When refueling is carried out, the property of fuel can be largely different from that before refueling. Therefore, at a time point the predetermined period elapses after detecting refueling, when only the second operation mode fuel property parameter has been estimated, the second operation mode fuel parameter is corrected based on the correction value set before refueling, whereby the accuracy of estimation of the fuel property parameter can be improved.

Preferably, the first operation mode is idling of the engine, and the second operation mode is a predetermined traveling state of the vehicle.

Although the combustion state of the engine is relatively stable during idling of the engine, it is less stable during the traveling state of the vehicle. Therefore, when the fuel property parameter is estimated according to the combustion state of the engine, the accuracy of the estimation generally tends to be higher during idling of the engine. Further, the accuracy of estimation of the fuel property parameter is influenced by variations in characteristics of an injector and like component parts of the engine between individual lots thereof and aging of the same, and the degree of the influence is recognized to be smaller during idling of the engine in which the combustion is stable, and larger during the traveling state of the vehicle.

From such facts, with the configuration of this preferred embodiment, idling of the engine is defined as the first operation mode, and a predetermined traveling state of the vehicle is defined as the second operation mode. Further, the second operation mode fuel property parameter estimated during the traveling state of the vehicle is corrected with reference to the first operation mode fuel property parameter which is estimated during idling of the engine and is higher in reliability, whereby it is possible to make the second operation mode fuel property parameter closer to an actual cetane value of fuel.

The above and other objects, features, and advantages of the invention will become more apparent from the following detailed description taken in conjunction with the accompanying drawings.

BRIEF DESCRIPTION OF THE DRAWINGS

FIG. 14 is a diagram showing three heat release amount maps associated with first to third cetane numbers, respectively;

FIG. 15 is an example of a table for use in determining a traveling-time provisional cetane number (CETDINT), which is created in the FIG. 13 process;

DETAILED DESCRIPTION OF THE PREFERRED EMBODIMENTS

Figure 1:
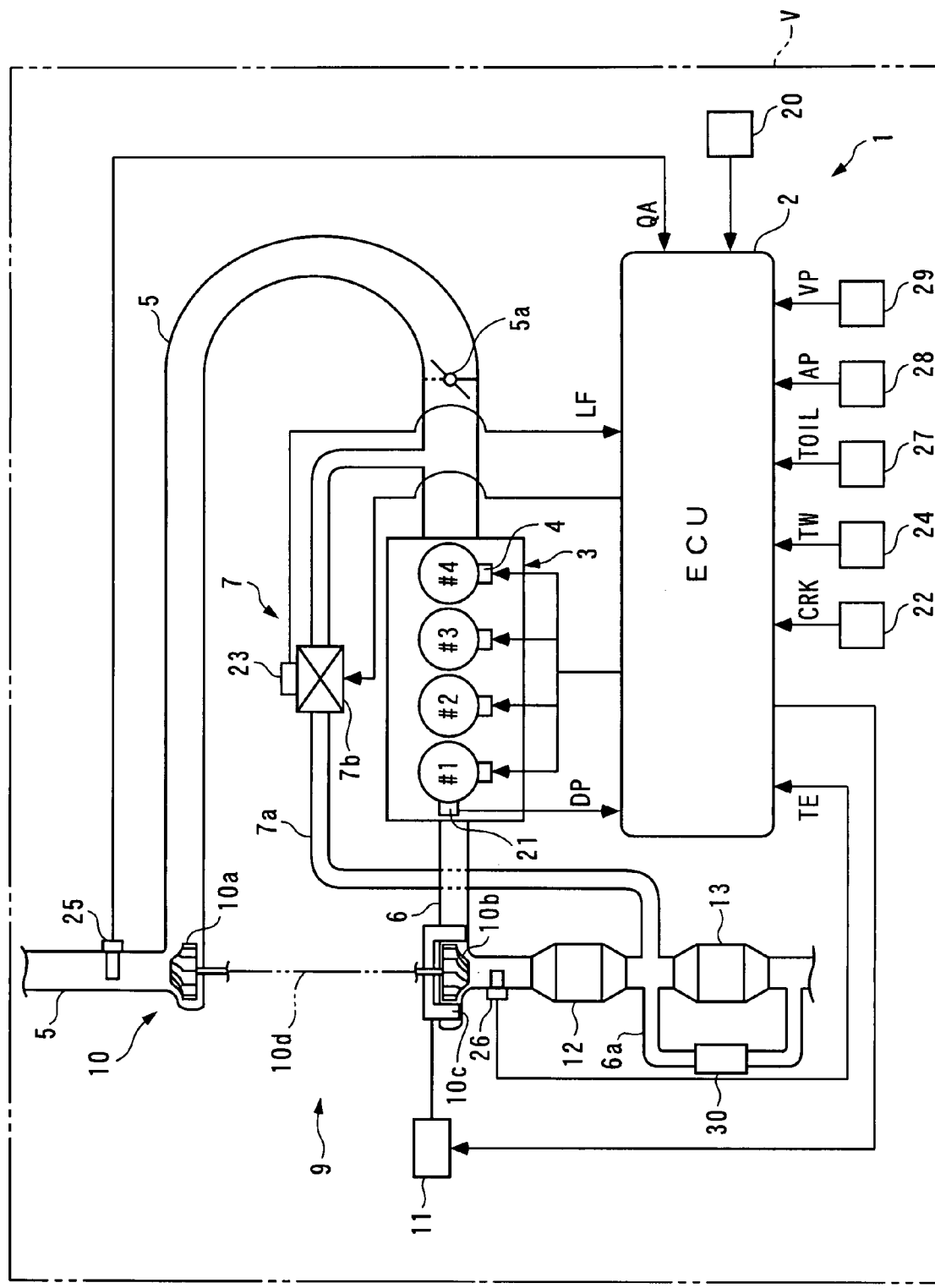
FIG. 1 is a schematic diagram of a control system according to an embodiment of the present invention, together with an internal combustion engine to which the control system is applied.

The invention will now be described in detail with reference to the drawings showing preferred embodiments thereof. FIG. 1 shows a control system 1 to which the present invention is applied, together with an internal combustion engine (hereinafter referred to as "the engine") 3. The engine 3 is an in-line four-cylinder diesel engine having first to fourth cylinders #1 to #4, and is installed on a vehicle V. Normally, in the engine 3, normal combustion is executed in which there are sequentially performed pilot injection for injecting fuel during a desired time period from a time point in the intake stroke to a time point in the compression stroke, and main injection for injecting fuel during the compression stroke.

Each of the cylinders #1 to #4 is provided with a fuel injection valve (hereinafter referred to as "the injector") 4. A fuel injection amount QINJ and fuel injection timing TINJ associated with each injector 4 are controlled by an injection pulse signal SINJ from an ECU 2.

An in-cylinder pressure sensor 21 is inserted in the cylinder #1. The in-cylinder pressure sensor 21 is implemented by a piezoelectric element and is integrally formed with a glow plug (not shown). The in-cylinder pressure sensor 21 senses an amount of change in pressure within the cylinder #1 (hereinafter referred to as "the in-cylinder pressure change amount DP") and delivers a signal indicative of the sensed in-cylinder pressure change amount DP to the ECU 2.

A magnet rotor (not shown) is mounted on a crankshaft (not shown) of the engine 3. The magnet rotor and an MRE pickup (not shown) form a crank angle sensor 22 that delivers a CRK signal and a TDC signal, which are both pulse signals, to the ECU 2 in accordance with rotation of the crankshaft.

Each pulse of the CRK signal is generated whenever the crankshaft rotates through a predetermined crank angle (e.g. 1°). The ECU 2 calculates rotational speed NE of the engine 3 (hereinafter referred to as "the engine speed NE") based on the CRK signal. The TDC signal indicates that a piston (not shown) of each cylinder is at a predetermined crank angle position in the vicinity of the top dead center (TDC) at the start of the intake stroke thereof. Further, the engine 3 is provided with a cylinder-discriminating sensor (not shown). The cylinder-discriminating sensor generates a pulse signal for use in discriminating each of the four cylinders #1 to #4 from the others, and delivers the signal to the ECU 2.

Further, the engine 3 is provided with an EGR system 7 comprised of an EGR pipe 7a and an EGR control valve 7b. The EGR pipe 7a extends to connect between a portion of an intake pipe 5 and a portion of an exhaust pipe 6. Part of exhaust gases emitted from the engine 3 are recirculated as EGR gases to the intake pipe 5 via the EGR pipe 7a and then flow into the cylinders #1 to #4. As a consequence, a combustion temperature within the engine 3 is lowered, whereby NOx contained in the exhaust gases is reduced.

The EGR control valve 7b is comprised of a butterfly valve (not shown) disposed in the EGR pipe 7a and a DC motor (not shown) for actuating the butterfly valve. An electric current supplied to the DC motor is controlled by the ECU 2 to linearly control the degree of opening of the butterfly valve, whereby the amount of EGR gases (hereinafter referred to as "the EGR amount") is controlled. The opening degree LF of the EGR control valve 7b (hereinafter referred to as "the EGR valve opening LF") is sensed by an EGR valve opening sensor 23, and a signal indicative of the sensed EGR valve opening is delivered to the ECU 2.

Further, the intake pipe 5 of the engine 3 is provided with a supercharging system 9. The supercharging system 9 is comprised of a turbo charger-type supercharger 10, and a vane actuator 11 connected to the supercharger 10. The supercharger 10 includes a compressor blade 10a rotatably provided in the intake pipe 5 at a location upstream of a throttle valve 5a, a turbine blade 10b and a plurality of rotatable variable vanes 10c (only two of which are shown) provided in intermediate portions of the exhaust pipe 6, and a shaft 10d integrally formed with these blades 10a and 10b to connect them. When the turbine blade 10b is driven for rotation by exhaust gases flowing through the exhaust pipe 6, a supercharging operation is performed. The vane actuator 11 is controlled by a control signal from the ECU 2, whereby the opening of each variable vane 10c is changed to control boost pressure.

An oxidation catalyst 12 and a DPF 13 are arranged from upstream to downstream in the mentioned order at respective locations downstream of the supercharger 10 in the exhaust pipe 6. The oxidation catalyst 12 oxidizes HC and CO in exhaust gases to reduce exhaust emissions. The DPF 13 collects particulate matter (hereinafter simply referred to as "PM"), such as soot, from exhaust gases to thereby reduce the amount of PM emitted into the air. Further, the DPF 13 carries the same type of oxidation catalyst (not shown) as the oxidation catalyst 12, on a surface thereof.

When exhaust gases pass through fine holes in a filter of the DPF 13, the DPF 13 collects PM by causing PM to be deposited on the surface of a filter wall and in the holes inside the filter wall. The filter wall is formed e.g. of ceramics, such as silicon carbide, or a porous metal body.

Furthermore, a pressure-introducing passage 6a connects between a portion of the exhaust pipe 6 at a location between the oxidation catalyst 12 and the DPF 13 and a portion of the same at a location downstream of the DPF 13, and a differential pressure sensor 30 is connected to the pressure-introducing passage 6a. The differential pressure sensor 30 detects a difference DPEX between pressures upstream and downstream of the DPF 13 in the exhaust pipe 6 (hereinafter simply referred to as "the differential pressure DPEX"). When the amount of PM deposited on the DPF 13 is smaller, the air flow resistance of the DPF 13 is lower so that the differential pressure DPEX is lower, whereas when the amount of the deposited PM is larger, the air flow resistance of the filter is larger so that the differential pressure DPEX is higher. Therefore, the differential pressure DPEX is an excellent indicator of the amount of the deposited PM.

An engine coolant temperature sensor 24 is mounted in the cylinder block of the engine 3. The engine coolant temperature sensor 24 senses a temperature TW of engine coolant circulating through the cylinder block of the engine 3 (hereinafter referred to as "the engine coolant temperature TW"), and delivers a signal indicative of the sensed engine coolant temperature TW to the ECU 2.

An air flow sensor 25 and an exhaust temperature sensor 26 are inserted into the intake pipe 5 and the exhaust pipe 6, respectively. The air flow sensor 25 senses an intake air amount QA and delivers a signal indicative of the sensed intake air amount QA to the ECU 2, while the exhaust temperature sensor 26 senses an exhaust temperature TE and delivers a signal indicative of the sensed exhaust temperature TE to the ECU 2.

Further, an oil temperature sensor 27, an accelerator pedal opening sensor 28 (operating condition-detecting means), and a vehicle speed sensor 29 (operating condition-detecting means) deliver signals to the ECU 2, which are respectively indicative of temperature of lubricating oil in the engine 3 (hereinafter referred to as "the oil temperature") TOIL, a stepped-on amount of an accelerator pedal (not shown) of the vehicle (hereinafter referred to as "the accelerator pedal opening") AP, and a vehicle speed VP. Furthermore, a refueling sensor 20 delivers a signal indicative of whether or not refueling has been carried out, according to the opening/closing of a fuel cock, to the ECU 2.

In the present embodiment, the ECU 2 implements fuel property parameter-estimating means, and fuel property parameter-determining means, and is formed by a microcomputer comprised of an I/O interface, a CPU, a RAM, and a ROM. The ECU 2 executes control processes for the engine 3, including a cetane number (CET)-calculating process for calculating a cetane number CET, described below, based on the signals from the aforementioned sensors 21 to 30, according to control programs stored in the ROM and the like.

Figure 2:
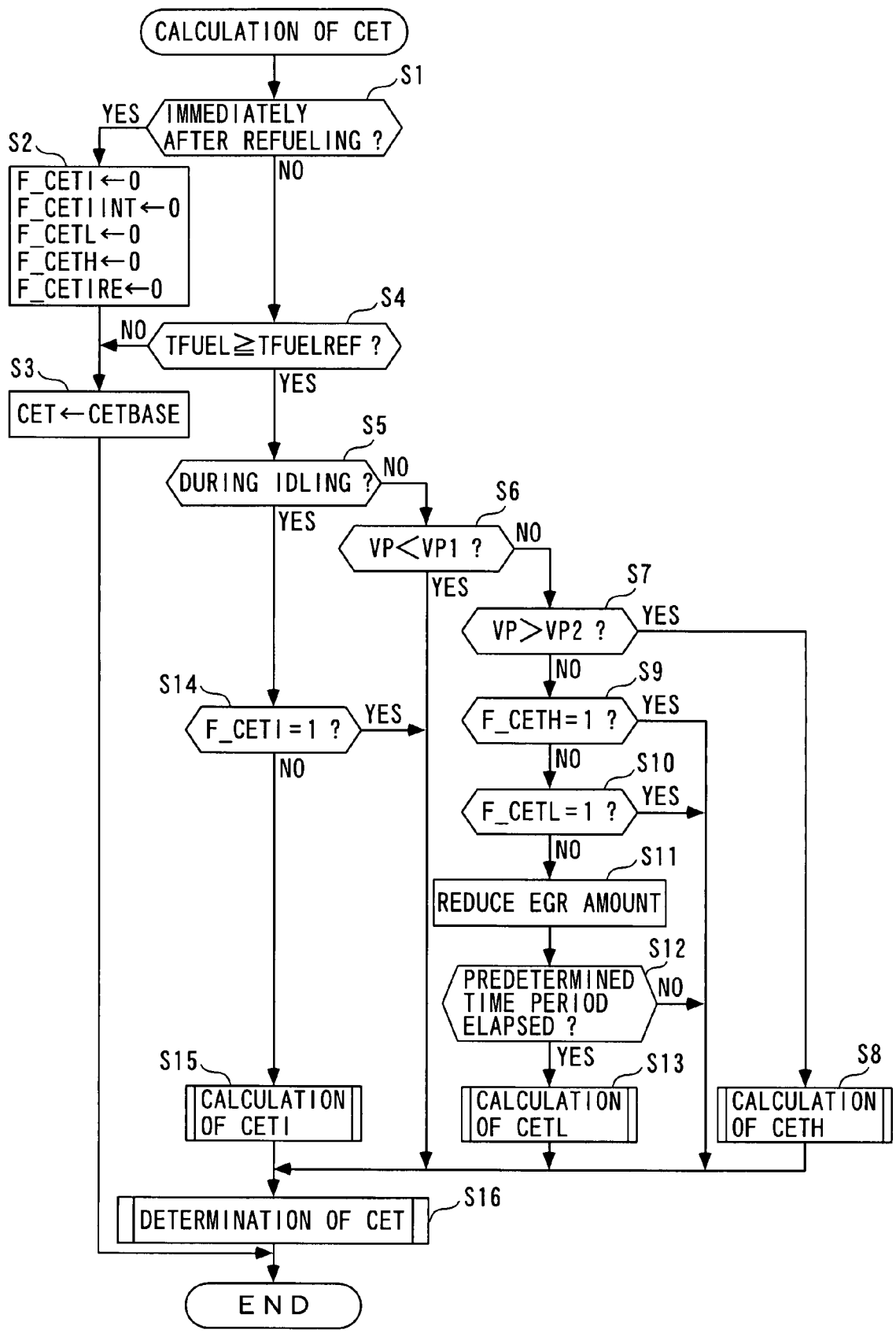
FIG. 2 is a flowchart showing a cetane number (CET)-calculating process executed by the control system according to the first embodiment.

FIG. 2 shows the CET-calculating process according to the present embodiment. In the present process, the cetane number of fuel is calculated as a fuel property parameter indicative of a property of fuel in association of each operating condition (operation mode) of the engine 3, and one of the calculated cetane numbers is set to the cetane number CET for control of the engine 3. The CET-calculating process is executed at predetermined time intervals. First, in a step 1 (shown as S1 in abbreviated form in FIG. 2; the following steps are also shown in abbreviated form), it is determined whether or not it is immediately after refueling. If the answer to the question is affirmative (YES), an idle-time cetane number calculation completion flag F_CETI, an idle-time cetane number provisional calculation flag F_CETIINT, a low load-time cetane number calculation completion flag F_CETL, a medium/high load-time cetane number calculation completion flag F_CETH, and an idle-time cetane number recalculation flag F_CETIRE are all reset to 0 (step 2).

Next, the cetane number CET is set to a predetermined provisional cetane number CETBASE (e.g. 45) in a step 3, followed by terminating the present process. This causes the engine 3 to be controlled according to the provisional cetane number CETBASE, immediately after refueling.

On the other hand, if the answer to the question of the step 1 is negative (NO), it is determined whether an operation time TFUEL of the engine 3 after refueling is not shorter than a predetermined time period TFUELREF (step 4). If the answer to the question is negative (NO), it is judged that the operation time of the engine 3 after refueling is short, and hence there is a possibility that fuel remaining e.g. in a pipe between a fuel tank and the engine 3 has not been fully replaced by the refueled fuel, and the step 3 is carried out without calculating the cetane number CET, followed by terminating the present process.

If the answer to the question of the step 4 is affirmative (YES), it is determined whether or not the engine 3 is idling (step 5). In this step, when the vehicle speed VP and the accelerator pedal opening AP are both equal to approximately 0, it is determined that the engine 3 is idling. If the answer to the question of the step 5 is negative (NO), it is determined whether or not the vehicle speed VP is lower than a first predetermined vehicle speed VP1 (e.g. 60 km/h) (step 6). If the answer to the question is affirmative (YES), i.e. if VP<VP1 holds, a step 16, described hereinafter, is executed without calculating the cetane number CET, followed by terminating the present process.

On the other hand, if the answer to the question of the step 6 is negative (NO), it is determined whether or not the vehicle speed VP is higher than a second predetermined vehicle speed VP2 (e.g. 80 km/h) which is higher than the first predetermined vehicle speed VP1 (step 7). If the answer to the question is affirmative (YES), i.e. VP>VP2 holds, it is judged that the vehicle V is in a medium/high-speed traveling state (predetermined traveling state) and the engine 3 is in a medium/high-load region, so that a medium/high load-time cetane number CETH is calculated in a step 8, and then the step 16 is executed, followed by terminating the present process.

Figure 3:
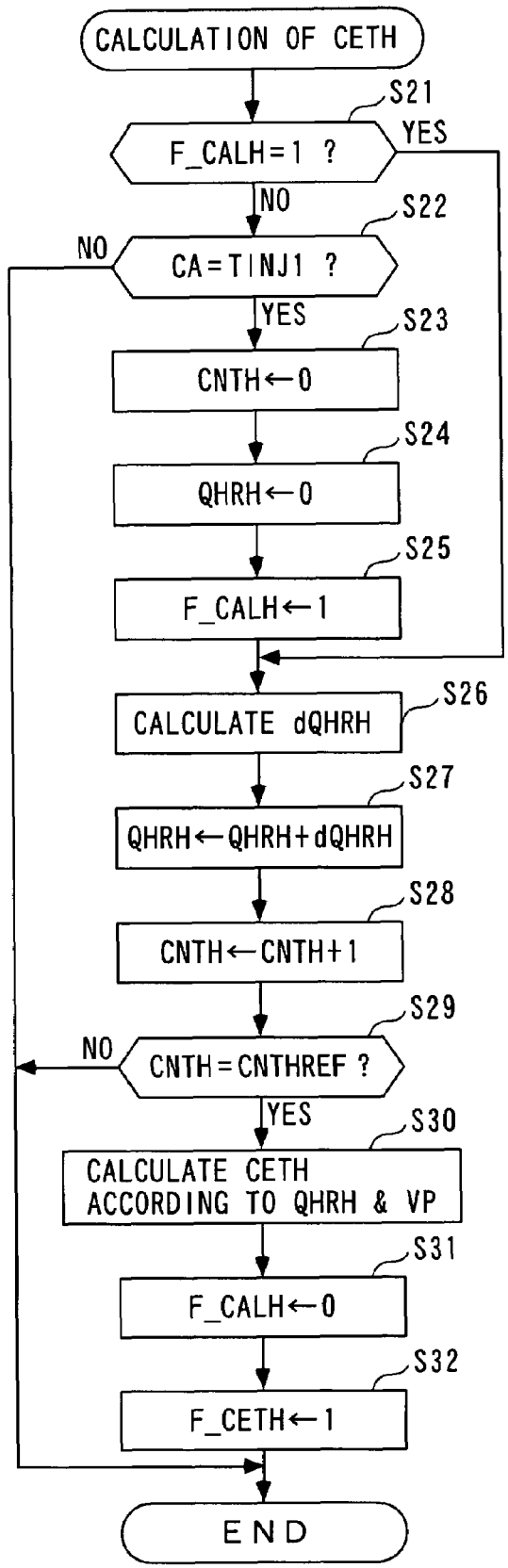
FIG. 3 is a flowchart showing a medium/high load-time cetane number (CETH)-calculating process.
Figure 4:
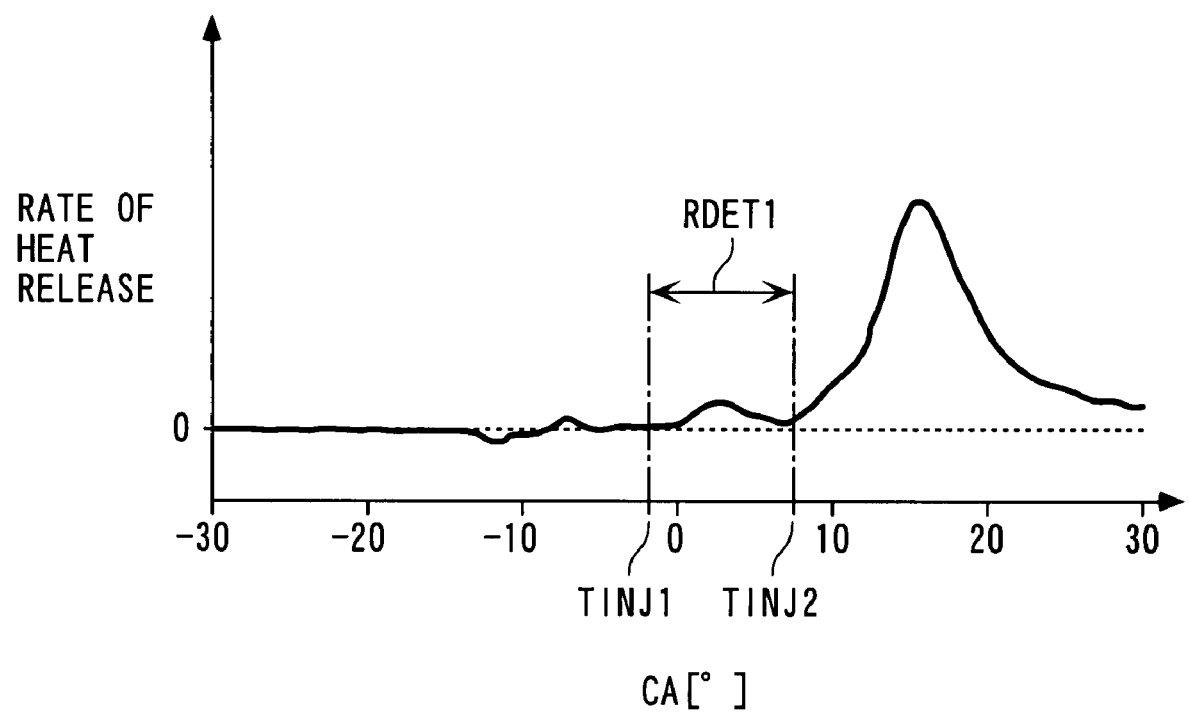
FIG. 4 is a diagram showing the relationship between a crank angle and a heat release rate in a normal combustion mode.

FIG. 3 shows a medium/high load-time cetane number (CETH)-calculating process for calculating the medium/high load-time cetane number CETH. In the present process, the amount of heat release caused by pilot injection is calculated during a predetermined calculation section RDET1 defined by pilot injection start timing TINJ1 and calculation end timing TINJ2, illustrated in FIG. 4, and the medium/high load-time cetane number CETH is calculated based on the calculated amount of heat release. The present process is executed in synchronism with generation of the TDC signal pulse whenever the crankshaft rotates through a crank angle of 1°.

In the present process, first, it is determined in a step 21 whether or not a calculation in-progress flag F_CALH is equal to 1 (step 21). If the answer to the question is negative (NO), i.e. if the medium/high load-time cetane number CETH is not being calculated, it is determined whether or not the present value of the crank angle CA is equal to the pilot injection start timing (hereinafter referred to as "the injection start timing") TINJ1 (step 22). If the answer to the question is negative (NO), the present process is immediately terminated.

On the other hand, if the answer to the question of the step 22 is affirmative (YES), it is determined that calculation of the medium/high load-time cetane number CETH is to be started, and a calculation counter CNTH and a heat release amount QHRH, referred to hereinafter, are both reset to 0 (steps 23 and 24). Then, the calculation in-progress flag F_CALH is set to 1 (step 25), and then the process proceeds to a step 26. As a consequence, in the following loops, the answer to the question of the step 21 becomes affirmative (YES), so that in this case, the steps 22 to 25 are skipped and the process directly proceeds to the step 26.

In the step 26, a heat release rate dQHRH (heat release amount per unit crank angle) is calculated by the following equation (1):

$$dQHRH = k/(k-1) \times P\theta \times 1000 \times dV\theta + 1/(k-1) \times DP \times 1000 \times V\theta \quad (1)$$

wherein
dQHRH: heat release rate (J/deg)
k: specific-heat ratio of mixture
$P\theta$: absolute value (kPa) of in-cylinder pressure
$dV\theta$: cylinder volume rise rate (m$^3$/deg)
$V\theta$: cylinder volume (m$^3$)
DP: amount of change in in-cylinder pressure (kPa/deg)

The specific-heat ratio k is set to a predetermined value (e.g. 1.39). Each of $P\theta$, dV, and $V\theta$ represents a value determined according to the crank angle position, and DP represents a value of the in-cylinder pressure change amount detected by the in-cylinder pressure sensor 21.

Figure 5:
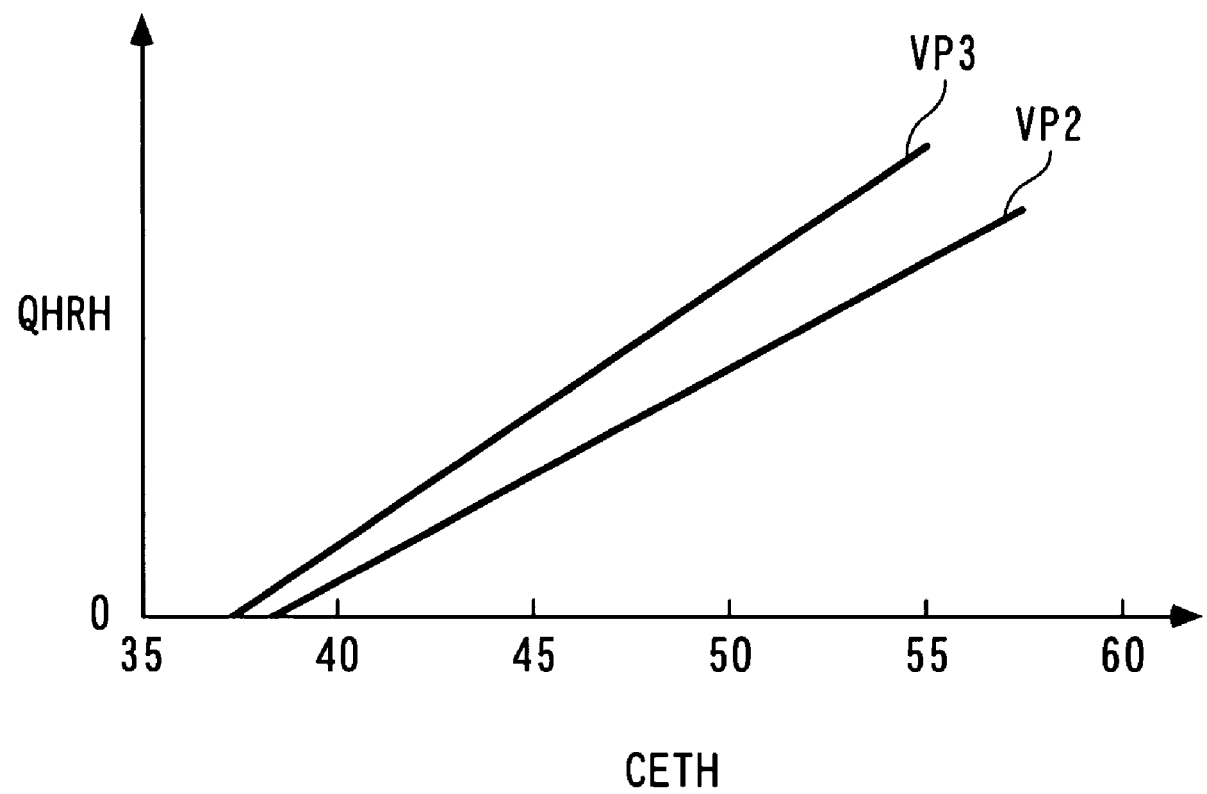
FIG. 5 is a diagram showing an example of a CETH table for use in the FIG. 3 process.

Then, the calculated heat release rate dQHRH is added to the immediately preceding value of the heat release amount QHRH, whereby the heat release amount QHRH as the total amount of heat which has been released or generated during a time period from the injection start timing TINJ1 to the present loop is calculated (step 27). Next, the calculation counter CNTH is incremented (step 28), and it is determined whether or not the count of the calculation counter CNTH has reached a predetermined value CNTHREF (step 29). The predetermined value CNTHREF is set to a value (e.g. 10) corresponding to the length of the calculation section RDET1. Therefore, if the answer to the question of the step S29 is negative (NO), the present process is immediately terminated, whereas if the answer to the question is affirmative (YES), it is judged that the calculation section RDET1 has come to the end, so that the medium/high load-time cetane number CETH is calculated by searching a CETH map shown in FIG. 5, according to the heat release amount QHRH calculated in the step 27 and the vehicle speed VP (step 30).

In the CETH map, there are provided two tables, one for the second predetermined vehicle speed VP2 and the other for a third predetermined vehicle speed VP3 (e.g. 100 km/h) which is higher than the second predetermined vehicle speed VP2. Each of the tables is set such that as the heat release amount QHRH is larger, the cetane number CETH becomes larger. This is because as the cetane number is larger, fuel burns more easily, which increases the heat release amount. Further, as is apparent from a comparison between the two tables, in the table for the third predetermined vehicle speed VP3 which is higher than the second predetermined vehicle speed VP2, the medium/high load-time cetane number CETH is set to a smaller value with respect to an identical value of the heat release amount QHRH than in the table for the second predetermined vehicle speed VP2. This is because assuming that the cetane number is the same, the higher the vehicle speed VP, i.e. the higher the load, the larger the heat release amount. It should be noted that when the vehicle speed VP is not equal to either the second predetermined vehicle speed VP2 or the third predetermined vehicle speed VP3, the medium/high load-time cetane number CETH is determined by interpolation.

Referring again to FIG. 3, in a step 31 following the step 30, the calculation in-progress flag F_CALH is reset to 0, and then the medium/high load-time cetane number calculation completion flag F_CETH is set to 1 (step 32) so as to indicate that calculation of the medium/high load-time cetane number CETH has been completed, followed by terminating the present process.

Referring again to FIG. 2, if the answer to the question of the step 7 is negative (NO), i.e. if VP1≦VP≦VP2 holds, it is judged that the vehicle V is in a low-speed traveling state (predetermined traveling state), which means that the engine 3 is in a low-load region, and it is determined whether or not the medium/high load-time cetane number calculation completion flag F_CETH and the low load-time cetane number calculation completion flag F_CETL are both equal to 1 (steps 9 and 10). If the answer to either of these questions is affirmative (YES), i.e. if calculation of the medium/high load-time cetane number CETH or the low load-time cetane number CETL has been completed, the step 16 is executed, followed by terminating the present process.

On the other hand, if the answers to the questions of the respective steps 9 and 10 are both negative (NO), the EGR control valve 7b is caused to be operated in the valve closing direction to reduce the EGR amount such that the EGR amount becomes equal to a predetermined EGR amount QEGR for a cetane number calculation time (step 11). The EGR amount QEGR for the cetane number calculation time is set to a predetermined ratio (e.g. 80%) with respect to a normal EGR amount.

Then, it is determined whether or not a predetermined time period (e.g. 5 to 10 sec) has elapsed after execution of control for reducing the EGR amount (step 12). If the answer to the question is negative (NO), the process proceeds to the step 16, whereas if the answer to the question is affirmative (YES), it is judged that the EGR amount has converged to the EGR amount QEGR for the cetane number calculation time, and the low load-time cetane number CETL is calculated in a step 13. Then, the step 16 is executed, followed by terminating the present process.

Figure 6:
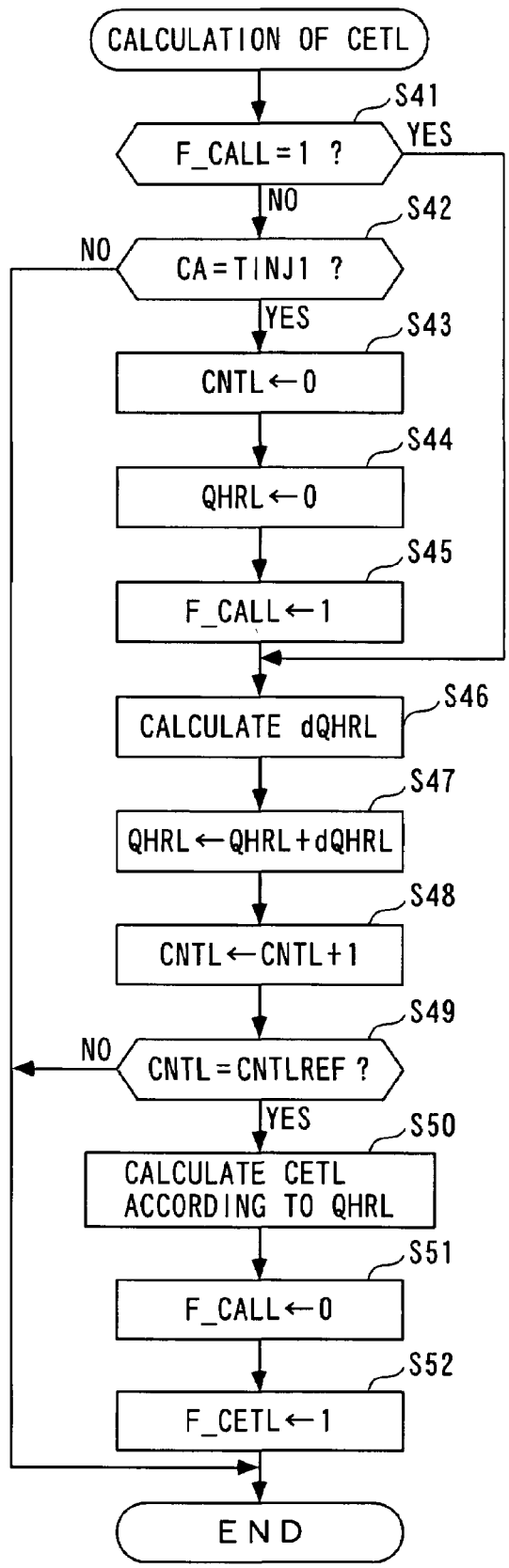
FIG. 6 is a low load-time cetane number (CETL)-calculating process.

FIG. 6 shows a low load-time cetane number (CETL)-calculating process for calculating the low load-time cetane number CETL. Processing carried out in this process is substantially the same as that in the CETH-calculating process for calculating the medium/high load-time cetane number CETH. In the present process, the low load-time cetane number CETL is calculated based on a heat release amount QHRL by executing steps 41 to 52 similarly to the steps 21 to 32, and when the calculation is completed, the low load-time cetane number calculation completion flag F_CETL is set to 1 (step 52).

Figure 7:
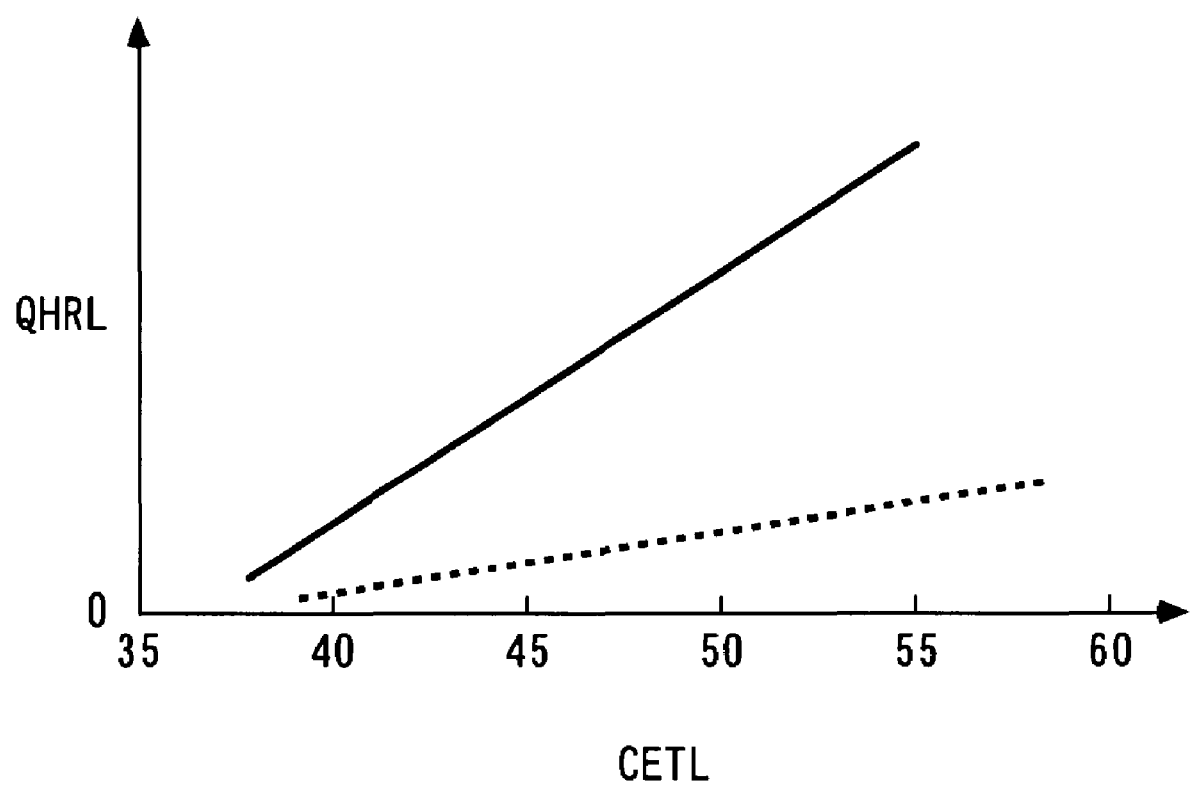
FIG. 7 is a diagram showing an example of a CETL table for use in the FIG. 6 process.

FIG. 7 shows a CETL table for use in calculation of the low load-time cetane number CETL in the step 50 of the present process. This table is set such that as the heat release amount QHRL is larger, the low load-time cetane number CETL becomes smaller. It should be noted that a broken line in FIG. 7 shows, for reference purposes, the relationship between the cetane number and the heat release amount in the case where control for reducing the EGR amount is not performed. More specifically, when the engine 3 is in the low-load region, the heat release amount is inherently small, and therefore the heat release amount changes relatively gently with respect to the cetane number. In the present embodiment, since the control for reducing the EGR amount is performed in the step 11, the proportion of fresh air in intake air drawn into each cylinder becomes larger to increase heat energy released or generated by combustion, and hence the heat release amount QHRL changes more largely with respect to the low load-time cetane number CETL than when the control for reducing the EGR amount is not performed. The CETL table is configured based on such a relationship between the heat release amount QHRL and the low load-time cetane number CETL.

As described above, in the medium/high-load region of the engine 3 where the vehicle speed VP>the second predetermined vehicle speed VP2 holds, the heat release amount QHRH is calculated according to the in-cylinder pressure change amount DP (steps 26 and 27), and then the medium/high load-time cetane number CETH is calculated according to the calculated heat release amount QHRH and the vehicle speed VP (step 30). Therefore, it is possible to estimate the medium/high load-time cetane number CETH with high accuracy.

Further, in the low-load region of the engine 3 where the first predetermined vehicle speed VP1≦the vehicle speed VP≦the second predetermined vehicle speed VP2 holds, the heat release amount QHRL is calculated according to the in-cylinder pressure change amount DP (steps 46 and 47), and then the low load-time cetane number CETL is calculated according to the calculated amount of heat release QHRL (step 50). In addition, prior to the calculation of the low load-time cetane number CETL, the heat release amount QHRL is increased by reducing the EGR amount (step 11), which makes it possible to increase the difference in the heat release amount QHRL dependent on the difference in cetane number. This makes it possible to calculate the low load-time cetane number CETL based on the heat release amount QHRL more accurately.

Referring again to FIG. 2, if the answer to the question of the step 5 is affirmative (YES), i.e. if the engine 3 is idling, it is determined whether or not the idle-time cetane number calculation completion flag F_CETI is equal to 1 (step 14). If the answer to the question is affirmative (YES), i.e. if the idle-time cetane number CETI has already been calculated, the process proceeds to the step 16. On the other hand, if the answer to the question of the step 14 is negative (NO), the idle-time cetane number CETI is calculated in a step 15, and then the step 16 is executed, followed by terminating the present process.

Figure 8:
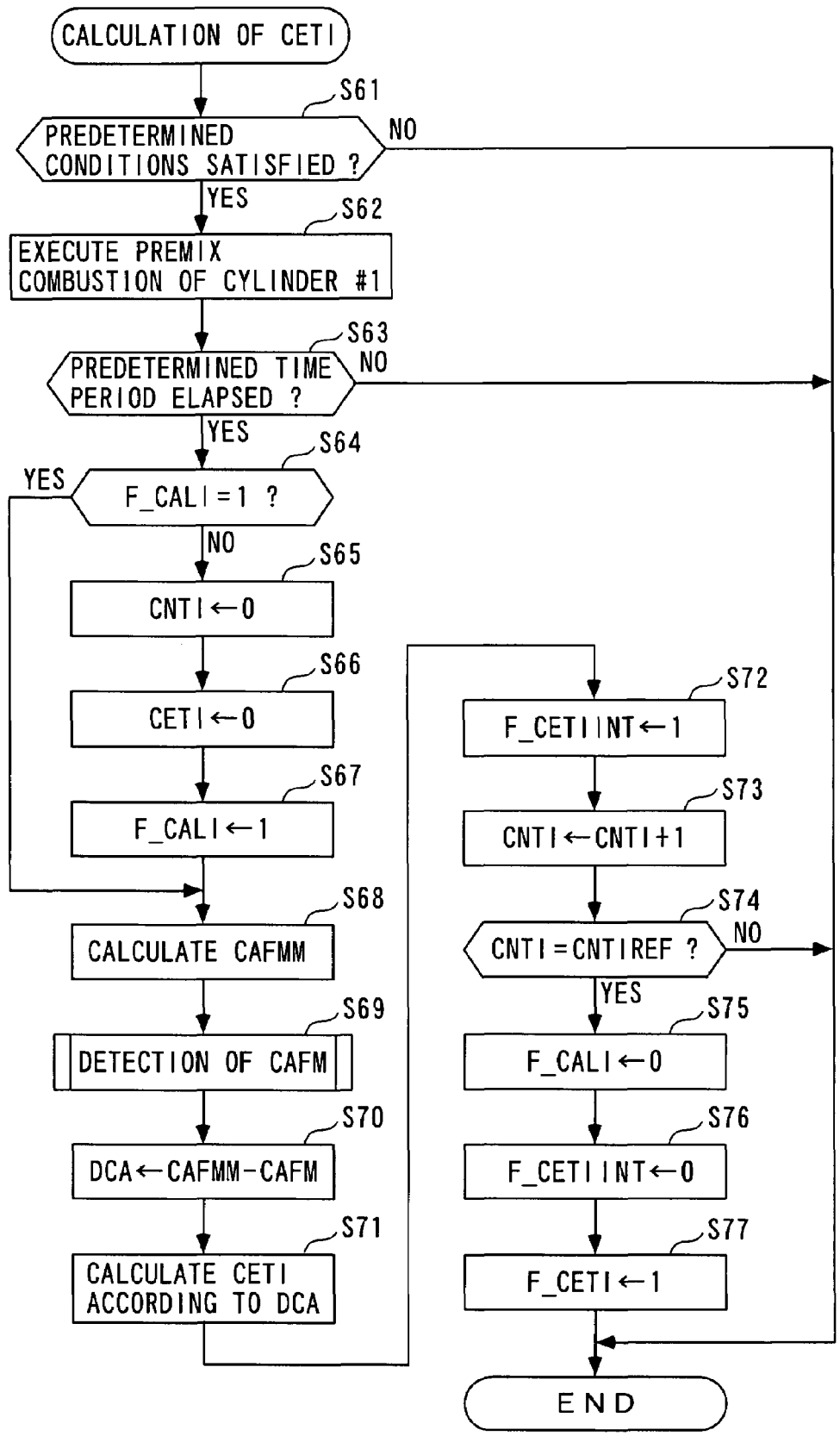
FIG. 8 is an idle-time cetane number (CETI)-calculating process.

FIG. 8 shows an idle-time cetane number (CETI)-calculating process for calculating the idle-time cetane number CETI. In the present process, the idle-time cetane number CETI is calculated according to the difference between reference ignition timing CAFMM and actual ignition timing CAFM, while performing premix combustion for the cylinder #1. The CETI-calculating process is executed in synchronism with generation of the CRK signal.

First, it is determined in a step 61 whether or not predetermined conditions of operation of the engine 3 are satisfied. The predetermined conditions of operation include, for example, a condition of the exhaust temperature TE being not lower than a predetermined temperature TEREF (e.g. 90° C.), and a condition of the engine coolant temperature TW or the oil temperature TOIL being not lower than a predetermined temperature TUP (e.g. 80° C.) indicative of the warmed-up state of the engine 3.

If the answer to the question of the step 61 is negative (NO), it is judged that conditions for executing the calculation of the idle-time cetane number CETI are not satisfied, and the present process is immediately terminated, whereas if the answer to the question is affirmative (YES), premix combustion is performed in the cylinder #1. Specifically, the pilot injection for the cylinder #1 is stopped, and a fuel injection amount QINJ#1 for the main injection is set to a predetermined fixed value QREF which is smaller than for normal combustion. Then, the injection start timing TINJ1 is set to a more advanced value than for normal combustion, whereby so-called premix combustion in which fuel is burned with delay after fuel injection is performed in the cylinder #1.

Then, it is determined whether or not a predetermined time period has elapsed after execution of the step 62 (step 63). If the answer to this question is negative (NO), the present process is immediately terminated, whereas if affirmative (YES), it is judged that a state of the premix combustion in the cylinder #1 has been stabilized, so that it is determined whether or not a calculation in-progress flag F_CALI is equal to 1 (step 64). If the answer to this question is negative (NO), it is judged that calculation of the idle-time cetane number CETI is to be started, and a calculation counter CNTI and the idle-time cetane number CETI are both reset to 0 (steps 65 and 66). Then, the calculation in-progress flag F_CALI is set to 1 (step 67), and the process proceeds to a step 68. After execution of the step 67, the answer to the question of the step 64 becomes affirmative (YES) in the following loops, so that in this case, the steps 65 to 67 are skipped and the process directly proceeds to the step 68.

In the step 68, the reference-ignition timing CAFMM is calculated by searching a CAFMM map (not shown) according to the engine speed NE and a demanded torque PMCMD. The demanded torque PMCMD is calculated by searching a map (not shown) according to the engine speed NE and the accelerator pedal opening AP.

In the CAFMM map, ignition timing obtained when fuel of a predetermined cetane number (e.g. 57) is burned by premix combustion is set to reference ignition timing CAFMM according to the engine speed NE and the demanded torque PMCMD. The reference ignition timing CAFMM is represented by a crank angle position.

Figure 9:
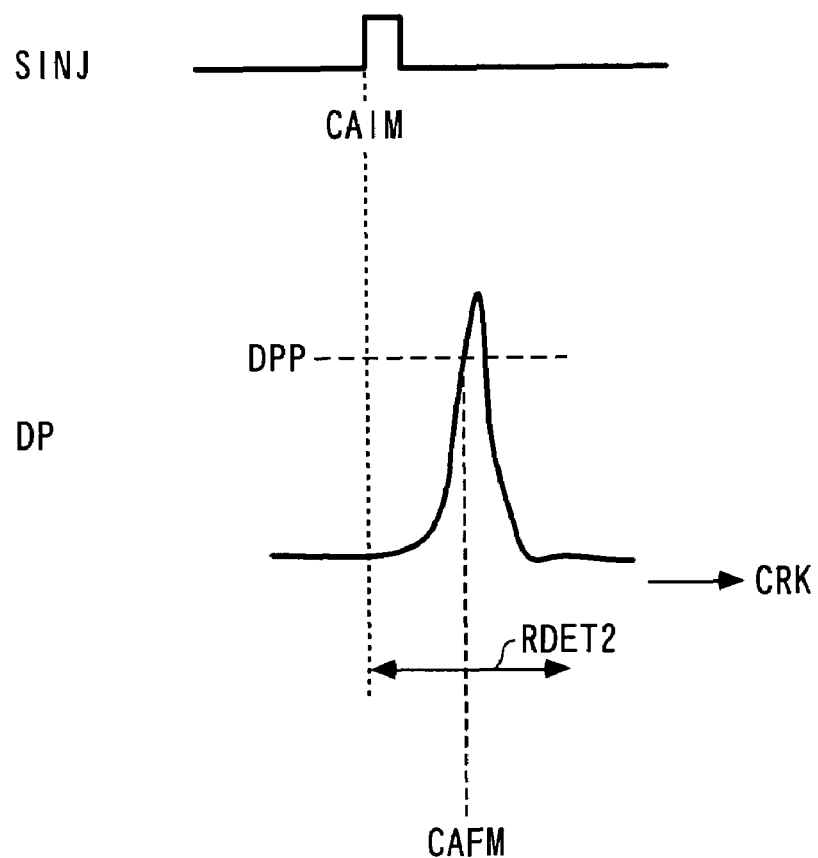
FIG. 9 is a diagram useful in explaining how to detect an actual ignition timing CAFM.

Then, an actual ignition timing CAFM in the cylinder #1 is detected (step 69). The detection of the actual ignition timing CAFM is performed as shown in FIG. 9 by way of example. More specifically, the injection pulse signal SINJ associated with the injector 4 is output at a crank angle position CAIM, and then a crank angle position which the piston takes when the in-cylinder pressure change amount DP exceeds a predetermined threshold value DPP is detected as the actual ignition timing CAFM. It should be noted that the detection of the actual ignition timing CAFM is performed while the rotation of the crankshaft is within a predetermined angular range DET2 (e.g. 10°) after output of the injection pulse signal SINJ.

Figure 10:
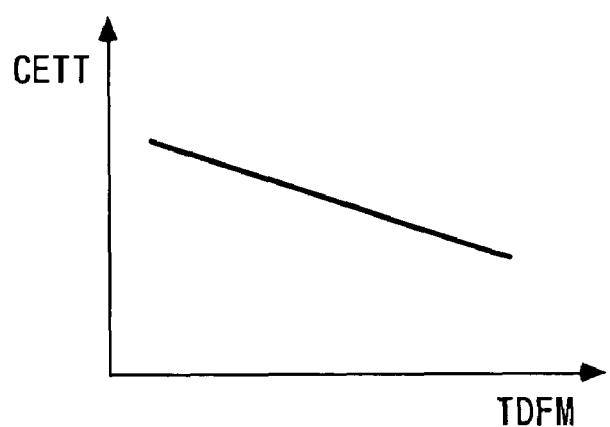
FIG. 10 is a diagram showing an example of a CRTT table for use in the FIG. 8 process.

Then, an ignition delay angle DCA is calculated by subtracting the actual ignition timing CAFM from the reference ignition timing CAFMM determined as described above (step 70). Thereafter, the idle-time cetane number CETI is calculated according to the calculated ignition delay angle DCA (step 71), followed by terminating the present process. Specifically, first, the ignition delay angle DCA is converted to an ignition delay time TDFM using the current engine speed NE, and then, the idle-time cetane number CETI is calculated by searching a CETT table shown in FIG. 10, according to the ignition delay time TDFM. In the CETT table, a provisional value CETT of the cetane number is set to a smaller value as the ignition delay time TDFM is larger. Next, the current idle-time cetane number CETI is calculated by weighted averaging of the calculated provisional value CETT and the immediately preceding value of the cetane number.

Then, the idle-time cetane number provisional calculation flag F_CETIINT is set to 1 so as to indicate that the idle-time cetane number CETI is being calculated (step 72). Thereafter, the calculation counter CNTI is incremented (step 73), and then it is determined whether or not the count of the calculation counter CNTI has reached a predetermined value CNTIREF (e.g. 10) (step 74). If the answer to the question is negative (NO), the present process is immediately terminated, whereas if the answer to the question is affirmative (YES), the calculation in-progress flag F_CALI and the idle-time cetane number provisional calculation flag F_CETIINT are both reset to 0 (steps 75 and 76), and then the idle-time cetane number calculation completion flag F_CETI is set to 1 so as to indicate that calculation of the idle-time cetane number CETI has been completed (step 77), followed by terminating the present process.

As described above, during calculation of the idle-time cetane number CETI, premix combustion is performed in the cylinder #1. During the premix combustion, the difference in ignition timing due to a difference in the cetane number CET of fuel is increased, which makes it possible to calculate the idle-time cetane number CETI based on ignition delay with high accuracy.

Figure 11:
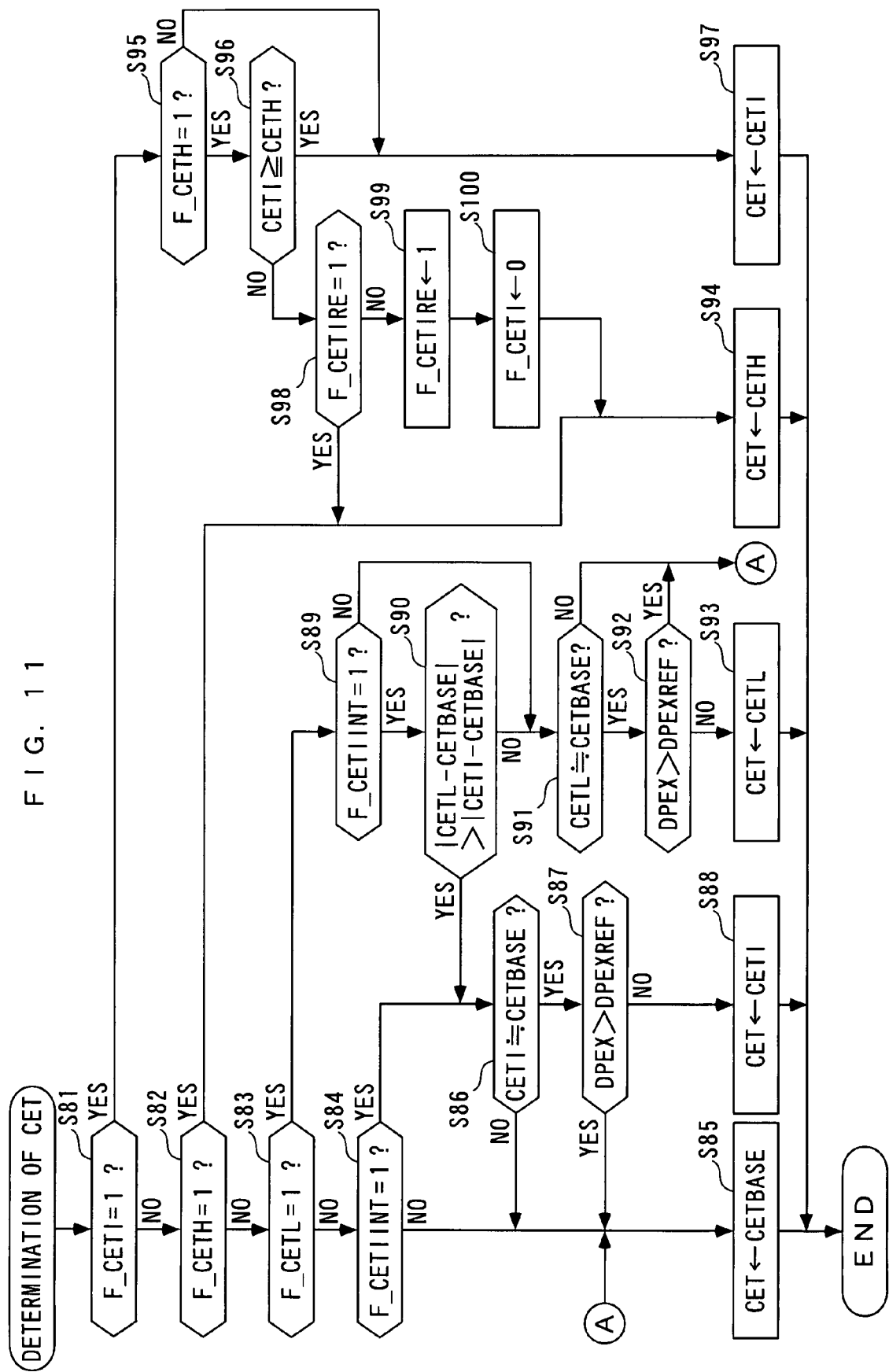
FIG. 11 is a flowchart showing a cetane number (CET) determining process carried out in the FIG. 2 process.

Referring again to FIG. 2, in the step 16 following the step 8, 13, or 15, the cetane number CET is determined. FIG. 11 shows a cetane number (CET)-determining process for determining the cetane number CET. First, in steps 81 to 84, it is determined whether or not the idle-time cetane number calculation completion flag F_CETI, the medium/high load-time cetane number calculation completion flag F_CETH, the low load-time cetane number calculation completion flag F_CETL, and the idle-time cetane number provisional calculation flag F_CETIINT are all equal to 1 (steps 81 to 84). If the answers to the questions of the respective steps 81 to 84 are all negative (NO), i.e. if none of the calculations of the idle-time cetane number CETI, the low load-time cetane number CETL, and the medium/high load-time cetane number CETH have been completed, and if the provisional value of the idle-time cetane number CETI has not been calculated, the cetane number CET is set to the predetermined provisional cetane number CETBASE (step 85), followed by terminating the present process.

If the answers to the questions of the respective steps 81 to 83 are negative (NO) and only the answer to the question of the step 84 is affirmative (YES), it is determined whether or not the provisional value, which has been provisionally calculated in the step 71 in FIG. 8, of the idle-time cetane number CETI is approximately equal to the predetermined provisional cetane number CETBASE (e.g. within a rage of CETBASE±3) (step 86).

If the answer to the question is negative (NO), i.e. if the provisional value of the idle-time cetane number CETI is quite different from the provisional cetane number CETBASE, the step 85 is executed, followed by terminating the present process, whereas if the answer to the question is affirmative (YES), it is determined whether or not the differential pressure DPEX is larger than a predetermined pressure DPEXREF (step 87). If the answer to the question is negative (NO), it is judged that the differential pressure DPEX is relatively low and the degree of clogging of the DPF 13 with PM is low, so that the cetane number CET is set to the provisional value of the idle-time cetane number CETI (step 88), followed by terminating the present process.

On the other hand, if the answer to the question of the step 87 is affirmative (YES), i.e. if DPEX>DPEXREF holds, it is judged that the control of the engine 3 by the use of the provisional value of the idle-time cetane number CETI has degraded exhaust emission characteristics, causing clogging of the DPF 13 with deposited PM, and therefore, the cetane number CET is switched to the provisional cetane number CETBASE in the step 85, followed by terminating the present process.

If the answers to the questions of the respective steps 81 and 82 are both negative (NO) and the answer to the question of the step 83 is affirmative (YES), i.e. if only calculation of the low load-time cetane number CETL has been completed, it is determined whether or not the idle-time cetane number provisional calculation flag F_CETIINT is equal to 1 (step 89). If the answer to this question is negative (NO), it is determined whether or not the low load-time cetane number CETL is approximately equal to the provisional cetane number CETBASE (step 91), and further it is determined, similarly to the step 87, whether or not the differential pressure DPEX is larger than the predetermined pressure DPEXREF (step 92).

If the answer to the question of the step 91 is negative (NO) or if the answer to the question of the step 92 is affirmative (YES), the step 85 is executed, followed by terminating the present process. On the other hand, if the answer to the question of the step 91 is affirmative (YES) and the answer to the question of the step 92 is negative (NO), i.e. if the low load-time cetane number CETL is approximately equal to the provisional cetane number CETBASE and the differential pressure DPEX is relatively low, the cetane number CET is set to the low load-time cetane number CETL (step 93), followed by terminating the present process.

If the answer to the question of the step 89 is affirmative (YES), i.e. if calculation of the low load-time cetane number CETL has been completed and the provisional value of the idle-time cetane number CETI has already been calculated, the process proceeds to a step 90, wherein it is determined whether or not the absolute value of the difference between the low load-time cetane number CETL and the provisional cetane number CETBASE is larger than the absolute value of the difference between the provisional value of the idle-time cetane number CETI and the provisional cetane number CETBASE, i.e. it is determined which of the low load-time cetane number CETL and the idle-time cetane number CETI is closer to the provisional cetane number CETBASE. If the answer to the question is affirmative (YES), it is judged that the provisional value of the idle-time cetane number CETI should be adopted, and the steps 86 et sec. are executed, followed by terminating the present process. On the other hand, if the answer to the question of the step 90 is negative (NO), it is judged that the low load-time cetane number CETL should be adopted, so that the steps 91 et sec. are executed, followed by terminating the present process.

If the answer to the question of the step 81 is negative (NO) and the answer to the question of the step 82 is affirmative (YES), i.e. if calculation of the idle-time cetane number CETI has not been completed, but calculation of the high-load cetane number CETH has been completed, it is judged that the high-load cetane number CETH should be adopted, so that the cetane number CET is set to the medium/high load-time cetane number CETH (step 94), followed by terminating the present process. This is because the low load-time cetane number CETL, which is calculated during execution of the EGR reduction control, as described above, is judged to be relatively unreliable.

On the other hand, if the answer to the question of the step 81 is affirmative (YES), i.e. if calculation of the idle-time cetane number CETI has been completed, it is determined whether or not the medium/high load-time cetane number calculation completion flag F_CETH is equal to 1 (step 95). If the answer to the question is negative (NO), the cetane number CET is set to the idle-time cetane number CETI (step 97), followed by terminating the present process.

If the answer to the question of the step 95 is affirmative (YES), it is determined whether the idle-time cetane number CETI is not smaller than the medium/high load-time cetane number CETH (step 96). If the answer to the question is affirmative (YES), i.e. if CETI≧CETH holds, the cetane number CET is set to the idle-time cetane number CETI in the step 97, followed by terminating the present process. On the other hand, if the answer to the question of the step 96 is negative (NO), i.e. if CETI<CETH holds, it is determined whether or not the idle-time cetane number recalculation flag F_CETIRE is equal to 1 (step 98). If the answer to the question is negative (NO), i.e. if recalculation of the idle-time cetane number CETI has not been carried out yet, the idle-time cetane number recalculation flag F_CETIRE is set to 1 (step 99), and the idle-time cetane number calculation completion flag F_CETI is reset to 0 (step 100). Then, the step 94 is executed, followed by terminating the present process.

After the step 100 is executed, the answer to the question of the step 14 in FIG. 2 becomes negative (NO), and calculation of the idle-time cetane number CETI is carried out again. Further, during the recalculation of the idle-time cetane number CETI, the answer to the question of the step 81 is negative (NO), and at the same time, calculation of the medium/high load-time cetane number CETH has already been completed (YES to the step 82), so that the cetane number CET is held at the medium/high load-time cetane number CETH by execution of the step 94.

When the recalculation of the idle-time cetane number CETI is completed, the idle-time cetane number calculation completion flag F_CETI is set to 1 in the step 77 in FIG. 8. As a consequence, the answer to the question of the step 81 becomes affirmative (YES) again, and in the step 96, it is determined whether or not the recalculated idle-time cetane number CETI is larger than the medium/high load-time cetane number CETH. If the answer to the question is affirmative (YES), the cetane number CET is switched to the idle-time cetane number CETI in the step 97. On the other hand, if the answer to the question is negative (NO), since the answer to the question of the step 98 has become affirmative (YES) after execution of the step 99, the process proceeds to the step 94, wherein the cetane number CET is held at the medium/high load-time cetane number CETH, followed by terminating the present process. The thus set cetane number CET is used to control the fuel injection amount QINJ and the fuel injection timing TINJ.

As described above, according to the present embodiment, when the engine 3 is in the idle operating condition, when the vehicle V is in the medium/high-speed traveling state, and when the vehicle V is in the low-speed traveling state, the cetane number CET of fuel in use is set to the idle-time cetane number CETI, the medium/high load-time cetane number CETH, and the low load-time cetane number CETL, respectively, so that differently from the conventional method in which the cetane number is estimated only during fuel cut-off operation, it is possible to increase occasions for estimating a cetane number which is finally set for use. Further, as described hereinbefore, when the idle-time cetane number CETI, the medium/high load-time cetane number CETH, and the low load-time cetane number CETL have all been calculated, the idle-time cetane number CETI or the medium/high load-time cetane number CETH is judged to be more reliable and adopted as the cetane number CET, so that the engine 3 can be controlled more appropriately. Furthermore, when estimation of the cetane number CET has not been performed or when the estimation has not been completed, the cetane number CET is set to the provisional cetane number CET-BASE, so that it is possible to prevent combustion of the engine 3 from becoming unstable. Moreover, when the idle-time cetane number CETI and the medium/high load-time cetane number CETH have been calculated, the cetane number CET is set to the higher one of the two, so that it is possible to avoid abnormal combustion which increases PM, thereby preventing PM from being increased.

Figure 12:
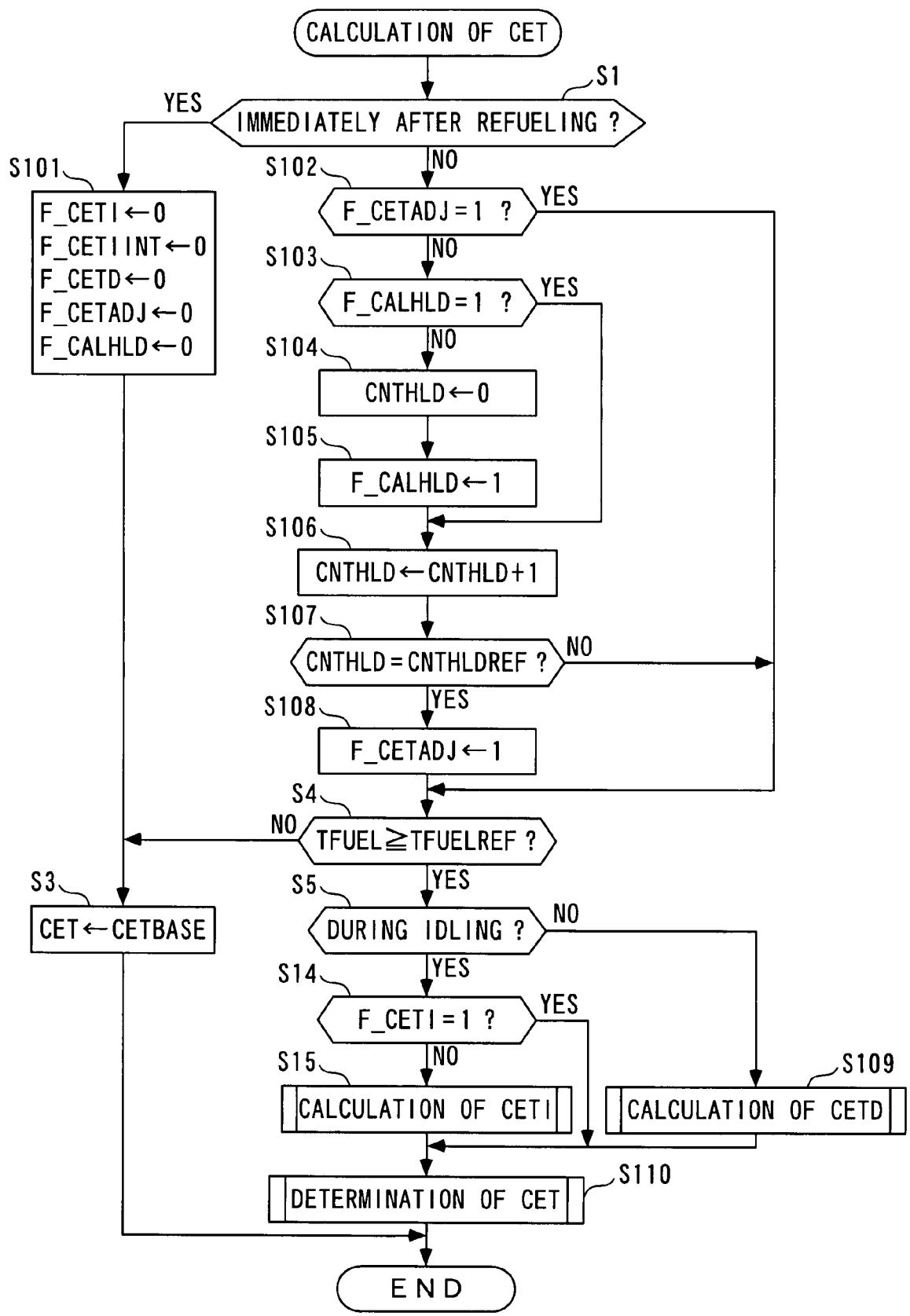
FIG. 12 is a flowchart showing a cetane number (CET)-calculating process executed by a control system according to a second embodiment of the present invention.

FIG. 12 is a flowchart showing a cetane number (CET)-calculating process executed by a control system according to a second embodiment of the present invention. In the present process, the idle-time cetane number CETI and a traveling-time cetane number CETD are estimated, respectively, during idling of the engine (a first operation mode) and during traveling of the vehicle V (a second operation mode), i.e. at times other than during the idling of the engine, and a cetane number CET for control of the engine 3 is determined based on these estimates. It should be noted that in FIG. 12, steps identical to those of the CET-calculating process according to the first embodiment described with reference to FIG. 2 are designated by the same step numbers.

First, in a step 1, it is determined, based on the signal from the refueling sensor 20, whether or not it is immediately after refueling. If the answer to the question is affirmative (YES), i.e. if it is immediately after refueling, the process proceeds to a step 101 corresponding to the step 2 in FIG. 2, wherein in addition to the idle-time cetane number calculation completion flag F_CETI and the idle-time cetane number provisional calculation flag F_CETIINT, a traveling-time cetane number calculation completion flag F_CETD, a correction permission flag F_CETADJ, and a standby flag F_CALHOLD are all reset to 0.

On the other hand, if the answer to the question of the step 1 is negative (NO), it is determined whether or not the correction permission flag F_CETADJ is equal to 1 (step 102), and then it is determined whether or not the standby flag F_CALHOLD is equal to 1 (step 103). If the answers to the respective questions are both negative (NO), a standby counter value CNTHLD is reset to 0 (step 104), and then the standby flag F_CALHOLD is set to 1 (step 105). As a consequence, the answer to the question of the step 103 becomes affirmative (YES) in the following loops, so that in this case, the steps 104 and 105 are skipped.

In a step 106 following the step 105 or 103, the standby counter value CNTHLD is incremented, and then it is determined whether or not the standby counter value CNTHLD is equal to a predetermined value CETHLDREF (corresponding to e.g. 10 minutes) (step 107). If the answer to the question is affirmative (YES), i.e. if a predetermined time period has elapsed after refueling was detected, the correction permission flag F_CETADJ is set to 1 (step 108). As a consequence, the answer to the question of the step 102 becomes affirmative (YES) in the following loops, so that in this case, the steps 103 to 107 are skipped.

The steps 4 et sec. following the step 108 or 102 or 107, include a step 109 as a subroutine which replaces the steps 6 to 13 of the CET-calculating process in FIG. 2. Specifically, the present embodiment is distinguished from the first embodiment in which the low load-time cetane number CETL and the medium/high load-time cetane number CETH are calculated in the steps 6 to 13, in that the traveling-time cetane number CETD is calculated in the step 109.

Figure 13:
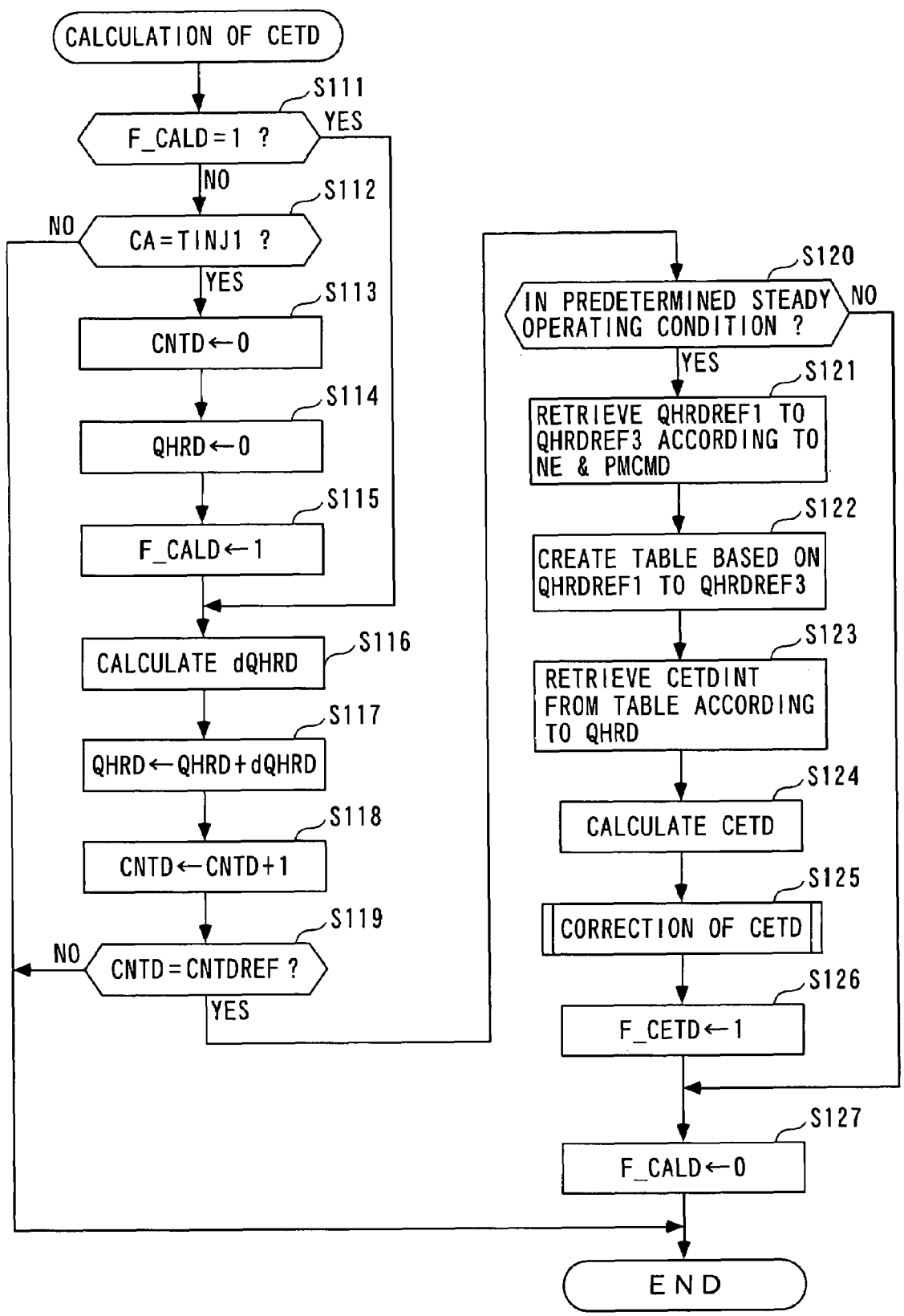
FIG. 13 is a flowchart showing a traveling-time cetane number (CETD)-calculating process executed in the FIG. 12 process.

FIG. 13 shows a traveling-time cetane number (CETD)-calculating process executed in the step 109 for calculating the traveling-time cetane number CETD. The present process is executed in synchronism with generation of the TDC signal pulse whenever the crankshaft rotates through a crank angle of 1°.

In the present process, first, steps 111 to 119 are executed similarly to the steps 21 to 29 of the process described with reference to FIG. 3, so as to calculate the heat release amount QHRD in the calculation section RDET1. Then, it is determined whether or not the engine 3 is in a predetermined steady operating condition (step 120). Specifically, when the vehicle speed VP, the engine speed NE, the demanded torque PMCMD, the accelerator pedal opening AP, the difference between an actual boost pressure and a target boost pressure, and the difference between an actual fresh air amount and a target fresh air amount are all within respective predetermined ranges, it is determined that the engine 3 is in the predetermined steady operating condition.

If the answer to the question of the step 120 is affirmative (YES), reference heat release amounts QHRDREF1 to QHRDREF3 are retrieved from respective three heat release amount maps shown in FIG. 14, according to the engine speed NE and the demanded torque PMCMD (step 121). These heat release amount maps are formed by empirically determining in advance values of the amount of heat release occurring in a single cylinder within a predetermined section corresponding to the calculation section RDET1 when the engine is operated using each of fuels having respective predetermined first to third cetane numbers CET1 to CET3 (e.g. 46, 50, and 55), and mapping the thus determined values of the heat release amount according to the engine speed NE and the demanded torque PMCMD, as the reference heat release amounts QHR- DREF1 to QHRDREF3. The heat release amount maps are stored in the ROM of the ECU 2.

Then, a table, shown in FIG. 15, for determining a traveling-time provisional cetane number CETDINT is created from combinations of the reference heat release amounts QHRDREF1 to QHRDREF3 retrieved as above and first to third cetane numbers associated with the respective reference heat release amounts (step 122). Specifically, three points (QC1 to QC3) determined by combining the first to third cetane numbers and the reference heat release amounts QHRDREF1 to QHRDREF3, respectively, are plotted on a table, as shown in FIG. 15, whereby the table which shows the relationship between the heat release amount QHRD and the traveling-time provisional cetane number CETDINT is created.

Next, the traveling-time provisional cetane number CETDINT is calculated by searching the table created as shown in FIG. 15, according to the heat release amount QHRD calculated in the step 117 (step 123). It should be noted that when the heat release amount QHRD is not equal to the reference heat release amounts QHRDREF1 to QHRDREF3, the traveling-time provisional cetane number CETDINT is determined by interpolation.

Then, the traveling-time cetane number CETD is calculated by carrying out filtering on the traveling-time provisional cetane number CETDINT (step 124). Specifically, the traveling-time cetane number CETD is calculated by the following equation (2):

$$CETD = K \cdot CETDINT + (1-K) \cdot CETD(n-1) \quad (2)$$

wherein K represents a predetermined weighting coefficient of less than 1.0. As is apparent from the equation (2), the traveling-time cetane number CETD is calculated by weighted averaging of the traveling-time provisional cetane number CETDINT determined in the current loop and the immediately preceding value CETD (n−1) of the traveling-time cetane number, using the weighting coefficient K.

Next, a CETD-correcting process, described in detail hereinafter, is executed (step 125), whereby the traveling-time cetane number CETD calculated in the step 124 is corrected using a correction value CETADJ, referred to hereinafter. Then, the traveling-time cetane number calculation completion flag F_CETD is set to 1 (step 126), and then a calculation in-progress flag F_CALD is reset to 0 (step 127), followed by terminating the present process. On the other hand, if the answer to the question of the step 120 is negative (NO), i.e. if the engine 3 is not in the predetermined steady operating condition, the step 127 is executed, followed by terminating the present process.

Figure 16:
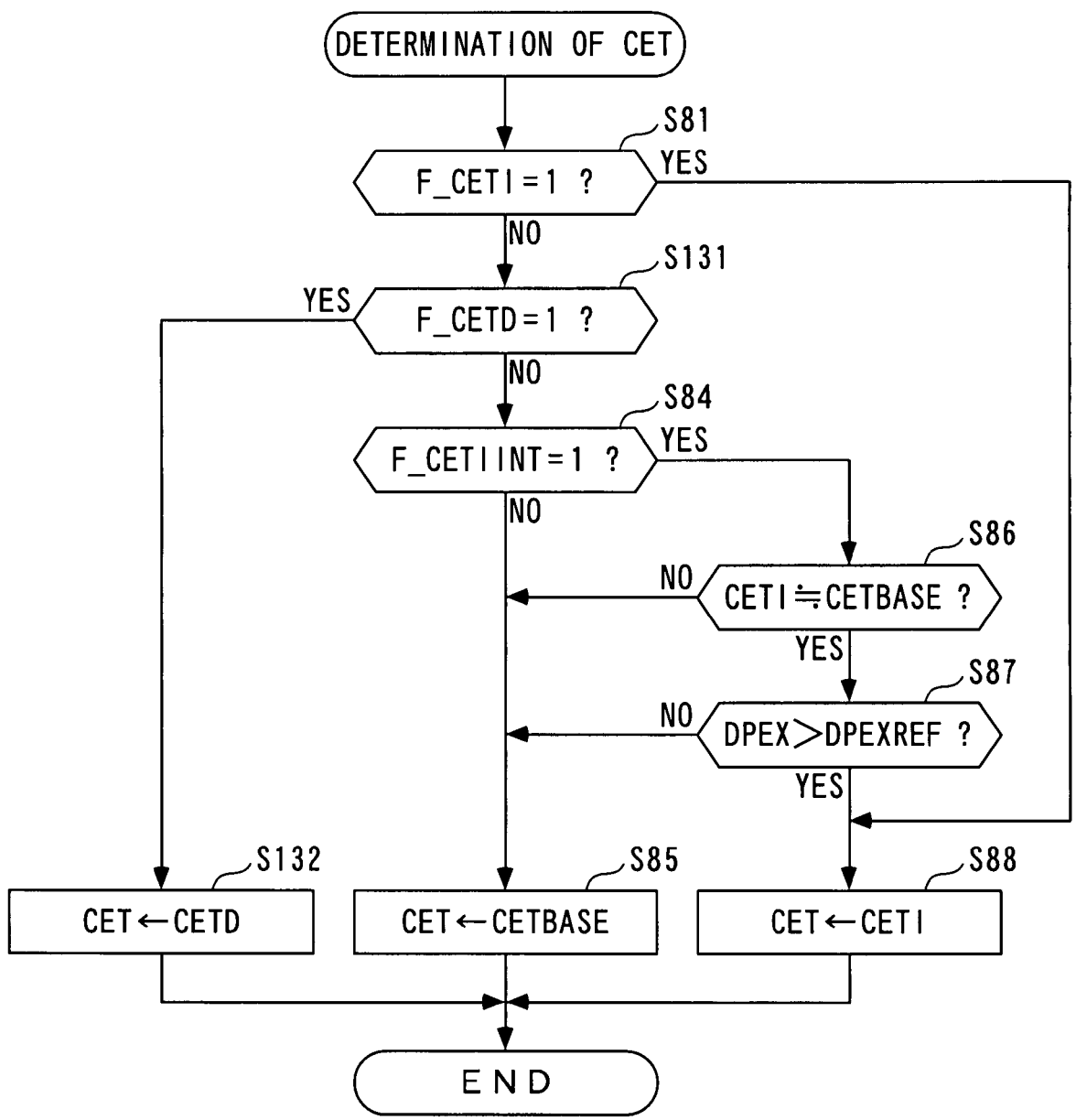
FIG. 16 is a flowchart showing a traveling-time cetane number (CETD)-determining process executed in the FIG. 12 process.

Referring again to FIG. 12, the cetane number CET is determined in a step 110 following the step 15 or 109. FIG. 16 shows a cetane number (CET)-determining process for determining the cetane number CET. In the CET-determining process, the step 81, a step 131, and the steps 84 to 88 are executed similarly to the steps 81 to 88 described with reference to FIG. 11, whereby the cetane number CET is set to the provisional cetane number CETBASE or the idle-time cetane number CETI depending on the idle-time cetane number calculation completion flag F_CETI, the traveling-time cetane number calculation completion flag F_CETD, and the idle-time cetane number provisional calculation flag F_CETIINT.

It should be noted that if the answer to the question of the step 81 is affirmative (YES), i.e. if calculation of the idle-time cetane number CETI has been completed, the idle-time cetane number CETI is preferentially selected as the cetane number CET in the step 88. On the other hand, if the answer to the question of the step 131 is affirmative (YES), i.e. if calculation of the idle-time cetane number CETI has not been completed, but calculation of the traveling-time cetane number CETD has been completed, the cetane number CET is set to the traveling-time cetane number CETD (step 132).

Figure 17:
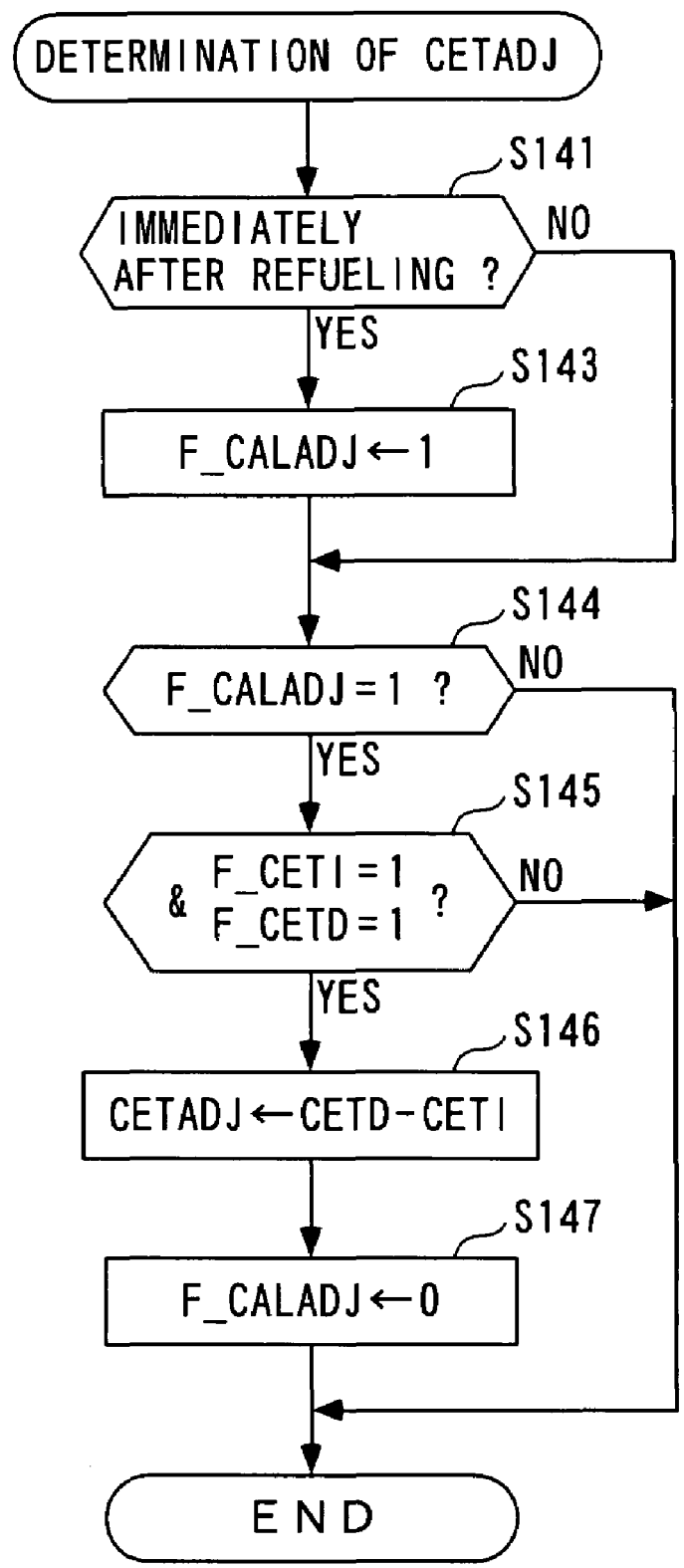
FIG. 17 is a flowchart showing a correction value (CET-ADJ)-setting process.

FIG. 17 shows a correction value (CETADJ)-setting process for setting the correction value CETADJ for use in correction of the traveling-time cetane number CETD in the step 125 in FIG. 13. This process is executed at predetermined time intervals.

First, similarly to the step 1 in FIG. 12, it is determined whether or not it is immediately after refueling (step 141). If the answer to the question is affirmative (YES), i.e. if it is immediately after refueling, a correction value calculation flag F_CALADJ is set to 1 (step 143), and then the process proceeds to a step 144. On the other hand, if the answer to the question of the step 141 is negative (NO), i.e. if it is not immediately after refueling, the step 143 is skipped and the process directly proceeds to the step 144.

In the step 144, it is determined whether or not the correction value calculation flag F_CALADJ is equal to 1. If the answer to the question is negative (NO), the present process is immediately terminated, whereas if the answer to the question is affirmative (YES), it is determined whether or not the idle-time cetane number calculation completion flag F_CETI and the traveling-time cetane number calculation completion flag F_CETD are both equal to 1 (step 145).

If the answer to this question is negative (NO), the present process is immediately terminated, whereas if the answer to the question is affirmative (YES), i.e. if both calculation of the idle-time cetane number CETI and calculation of the traveling-time cetane number CETD have been completed, the correction value CETADJ is set to a value obtained by subtracting the idle-time cetane number CETI from the traveling-time cetane number CETD (step 146). Then, the correction value calculation flag F_CALADJ is reset to 0 (step 147), followed by terminating the present process.

Figure 18:
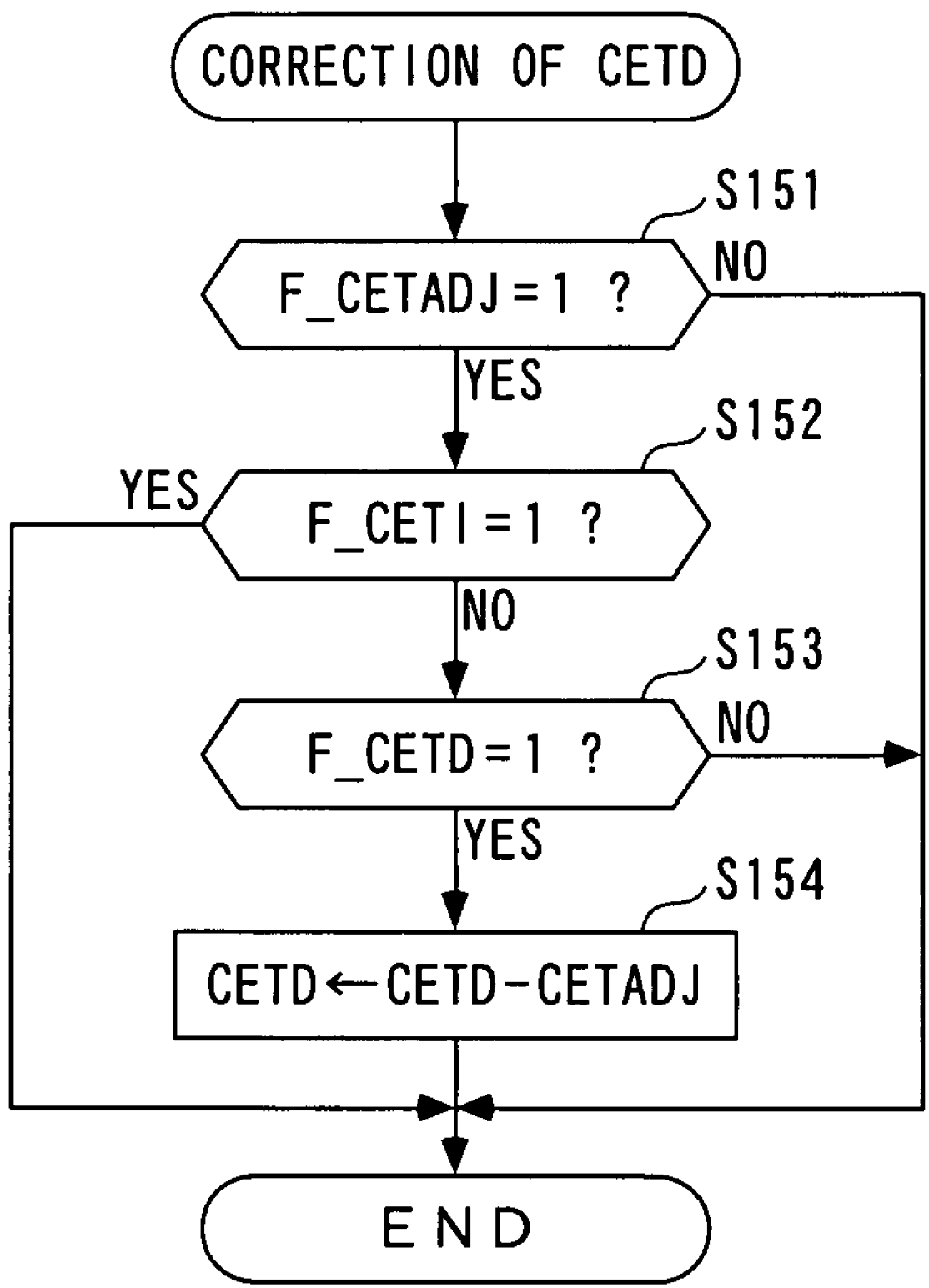
FIG. 18 is a flowchart showing a traveling-time cetane number (CETD)-correcting process using a correction value CETADJ.

FIG. 18 shows a traveling-time cetane number (CETD)-correcting process executed in the step 125 in FIG. 13, for correcting the traveling-time cetane number CETD using the correction value CETADJ. This process is executed at predetermined time intervals.

In the present process, first, it is determined whether or not the correction permission flag F_CETADJ is equal to 1 (step 151). If the answer to the question is negative (NO), the present process is immediately terminated. On the other hand, if the answer to the question is affirmative (YES), i.e. if a predetermined time period has elapsed after refueling, it is determined whether or not the idle-time cetane number calculation completion flag F_CETI is equal to 1 (step 152), and then it is determined whether or not the traveling-time cetane number calculation completion flag F_CETD is equal to 1 (step 153).

If the answer to the question of the step 152 is negative (NO) and the answer to the question of the step 153 is affirmative (YES), i.e. if calculation of the idle-time cetane number CETI has not been completed yet but calculation of the traveling-time cetane number CETD has already been completed, the traveling-time cetane number CETD is set to a value obtained by subtracting the correction value CETADJ calculated in the process in FIG. 17 from the traveling-time cetane number CETD calculated in the FIG. 13 process (step 154). The cetane number CET is set to the thus corrected traveling-time cetane number CETD in the step 132 in FIG. 16. On the other hand, if the answer to the question of the step 152 is affirmative (YES), i.e. if calculation of the idle-time cetane number CETI has already been completed, or if the answers to the questions of the respective steps 152 and 153 are both negative (NO), i.e. if neither calculation of the idle-time cetane number CETI nor calculation of the traveling-time cetane number CETD has been completed, the present process is immediately terminated without correcting the traveling-time cetane number CETD.

As described above, according to the present embodiment, the difference between the idle-time cetane number CETI and the traveling-time cetane number CETD is set as the correction value CETADJ in advance, and when a predetermined time period has elapsed after refueling, if only the traveling-time cetane number CETD has been calculated, the traveling-time cetane number CETD is corrected using the correction value CETADJ. Therefore, even in a case where only the traveling-time cetane number CETD, which is less reliable, has been calculated after refueling, it is possible to properly correct the traveling-time cetane number CETD with reference to the idle-time cetane number CETI, which is more reliable, to thereby make the traveling-time cetane number CETD closer to an actual cetane number. This makes it possible to improve the accuracy in the estimation of the cetane number.

It should be noted that the present invention is not limited to the embodiments described above, but can be practiced in various forms. For example, the methods of finally determining the cetane number CET, which are described with reference to FIGS. 11 and 16, are shown only by way of example, and therefore details of the methods can be changed or modified as deemed appropriate.

Although in the second embodiment, the traveling-time cetane number CETD is corrected when the predetermined time period has elapsed after refueling was detected, this is not limitative, but for example, the correction may be carried out when the travel distance of the vehicle V after refueling has exceeded a predetermined distance (e.g. 10 km). Further, although in the second embodiment, the difference between the idle-time cetane number CETI and the traveling-time cetane number CETD is used as the correction value for correcting the traveling-time cetane number CETD, the traveling-time cetane number CETD may be corrected with reference to the idle-time cetane number CETI, using a ratio between the two cetane numbers CETI and CETD as a parameter indicative of the relationship between the two, for example.

Furthermore, depending on the relationship between the idle-time cetane number CETI, the low load-time cetane number CETL, and the medium/high load-time cetane number CETH estimated in the first embodiment, one of the three cetane numbers regarded as less reliable may be corrected with reference to another which is more reliable. Specifically, the low load-time cetane number CETL and/or the medium/high load-time cetane number CETH may be corrected with reference to the idle-time cetane number CETI, or further, the low load-time cetane number CETL may be corrected with reference to the medium/high load-time cetane number CETH.

Although in each of the above-described embodiments, the cetane number is used as a fuel property parameter, this is not limitative, but any other suitable parameter indicative of a property of fuel may be employed. Moreover, the present invention can be applied to various types of engines, including ship propulsion engines, such as an outboard motor having a vertically-disposed crankshaft.

It is further understood by those skilled in the art that the foregoing is a preferred embodiment of the invention, and that various changes and modifications may be made without departing from the spirit and scope thereof.

What is claimed is:

1. A control system for an internal combustion engine, for controlling the engine based on a fuel property parameter indicative of a property of fuel used in the engine which is installed on a vehicle, comprising:
   operating condition-detecting means for detecting operating conditions of the engine;
   fuel property parameter-estimating means for estimating the fuel property parameter when the detected operating conditions of the engine correspond to any of a plurality of operation modes; and
   fuel property parameter-determining means for determining, depending on a plurality of fuel property parameters estimated in the respective operation modes, one of the fuel property parameters as the fuel property parameter for control of the engine.

2. A control system as claimed in claim 1, wherein the fuel property parameter is a cetane number of fuel, and
   wherein said fuel property parameter-determining means determines a highest one of a plurality of cetane numbers estimated by said fuel property parameter-estimating means as a cetane number for the control.

3. A control system as claimed in claim 1, wherein the operation modes include a predetermined first operation mode, and a predetermined second operation mode in which accuracy of estimation of the fuel property parameter by said fuel property parameter-estimating means is considered to be lower than in the predetermined first operation mode,
   the control system further comprising correction value-setting means for setting, based on a relationship between a first operation mode fuel property parameter estimated in the first operation mode and a second operation mode fuel property parameter estimated in the second operation mode, a correction value for correcting the second operation mode fuel property parameter.

4. A control system as claimed in claim 3, further comprising refueling detection means for detecting whether or not refueling has been carried out, and
   fuel property parameter-correcting means for correcting the second operation mode fuel property parameter based on the correction value, when estimation of the first operation mode fuel property parameter is not carried out and at the same time estimation of the second operation mode fuel property parameter is carried out, until a predetermined time period elapses after refueling is detected.

5. A control system as claimed in claim 3, wherein the first operation mode is idling of the engine, and the second operation mode is a predetermined traveling state of the vehicle.

6. A control system as claimed in claim 1, wherein said fuel property parameter-determining means determines a predetermined fuel property parameter as the fuel property parameter for the control, when estimation of the fuel property parameter by said fuel property parameter-estimating means has not been carried out.

7. A control system as claimed in claim 1 or 6, wherein the operation modes include idling of the engine, and a predetermined traveling state of the vehicle.

* * * * *